(12) United States Patent
Jung

(10) Patent No.: US 11,556,497 B2
(45) Date of Patent: Jan. 17, 2023

(54) REAL-TIME ARCHIVING METHOD AND SYSTEM BASED ON HYBRID CLOUD

(71) Applicant: ARMIQ Co., Ltd., Seoul (KR)

(72) Inventor: Sehun Jung, Seoul (KR)

(73) Assignee: Armiq Co., Ltd., Seoul (KR)

( * ) Notice: Subject to any disclaimer, the term of this patent is extended or adjusted under 35 U.S.C. 154(b) by 0 days.

(21) Appl. No.: 17/076,073

(22) Filed: Oct. 21, 2020

(65) Prior Publication Data

US 2021/0209058 A1    Jul. 8, 2021

(30) Foreign Application Priority Data

Jan. 6, 2020 (KR) .................... 10-2020-0001413
Aug. 27, 2020 (KR) .................... 10-2020-0108750

(51) Int. Cl.
*G06F 15/16* (2006.01)
*G06F 16/11* (2019.01)
*G06F 16/182* (2019.01)
*G06F 16/16* (2019.01)
*G06F 16/14* (2019.01)
*G06F 16/174* (2019.01)

(52) U.S. Cl.
CPC .......... *G06F 16/113* (2019.01); *G06F 16/148* (2019.01); *G06F 16/156* (2019.01); *G06F 16/162* (2019.01); *G06F 16/1744* (2019.01); *G06F 16/1827* (2019.01)

(58) Field of Classification Search
None
See application file for complete search history.

(56) References Cited

U.S. PATENT DOCUMENTS

| 7,680,830 B1* | 3/2010 | Ohr ................. G06F 16/125 707/999.2 |
| 2004/0148303 A1* | 7/2004 | McKay ............... G06F 16/23 |
| 2006/0059173 A1* | 3/2006 | Hirsch ............ G06F 11/1453 |
| 2013/0031158 A1* | 1/2013 | Salsburg ........... G06F 9/5077 709/203 |
| 2015/0074279 A1* | 3/2015 | Maes ................. H04L 67/51 709/226 |

(Continued)

FOREIGN PATENT DOCUMENTS

KR    10-2014-0072929    6/2014

OTHER PUBLICATIONS

Oliveira et al. One index to dominate them all: Domain Indexes for improving queries across multiple tables. SAC 2017, pp. 900-906. (Year: 2017).*

(Continued)

*Primary Examiner* — Alex Gofman
*Assistant Examiner* — Shelly X Qian
(74) *Attorney, Agent, or Firm* — Nixon Peabody LLP

(57) ABSTRACT

Provided are a data archiving method and apparatus capable of providing a remote near-line data archiving function by receiving remote function invoking from a target system in which data is stored, providing the target system with a first function for archiving, in a storage system, at least some of the data stored in the target system over a network in response to the remote function invoking, and providing the target system with a second function for the query of the data archived in the storage system over the network.

8 Claims, 19 Drawing Sheets

(56) References Cited

U.S. PATENT DOCUMENTS

2015/0347443 A1* 12/2015 Reid ..................... G06F 16/22
707/693

OTHER PUBLICATIONS

What is Software as a Service (SaaS): A Beginner's Guide, https://www.salesforce.com/in/saas/, May 2020, pp. 1-3. (Year: 2020).*
What is SaaS (Software as a Service)? https://www.salesforce.com/saas/, 2019, pp. 1-4. (Year: 2019).*

* cited by examiner

FIG. 8

| PERIOD | OBJECT ID |
|--------|-----------|
| 2002.01 | O0001 |
| 2002.02 | O0002 |
| 2002.03 | O0003 |

FIG. 9

| Col1 | OBJECT ID |
|------|-----------|
| 1000 | O0001 |
| 2000 | O0002 |

910 — Col1
920 — OBJECT ID
900 — (table)

FIG. 11

| PERIOD | Col1 | OBJECT ID |
|--------|------|-----------|
| 2002.01 | 1000 | O0001 |
| 2002.01 | 2000 | O0002 |
| 2002.02 | 1000 | O0003 |
| 2002.02 | 2000 | O0004 |
| 2002.03 | 1000 | O0005 |
| 2002.03 | 2000 | O0006 |

FIG. 19

| Processing Scheme | Detailed Technique | Description | Example (before ► after) | |
|---|---|---|---|---|
| Pseudonymization | Heuristic Pseudonymization | Method of substituting values corresponding to identifier with some determined rules (N:1) | Lee Beom-Soo | Hong Gil-dong |
| | Encryption | Method of substituting personal information through encryption to which algorithm having given rule is applied | 880204-1234567 | A594FB3B130 |
| | Swapping | Method of substituting record of existing DB in association with predetermined item value (1:1) | Man, woman | A, B |
| Aggregation | Aggregation | Method of substituting part of or entire data through aggregation (total sum, average, etc.) | Age 45 (actual age) | Age 37 (total average age) |
| | Micro Aggregation | Method of aggregating only some portion within data set | 2 million Korean won (only forties having great income deviation) | 3.5 million Korean won (average income of forties) |
| | Rounding | Final aggregation method by applying rounding (round-up, round-down, round off to nearest integer) | 73 kg | 70 kg (round-off) |
| | Rearrangement | Method of avoiding damage to entire information by mixing personal information with others' information | A type (Lee Beom-Soo) | O type (Kim Sang-gin) |
| Data Reduction | Delete Identifier | Method of simply deleting identifier from original data | 1988.02.04 | 1988 (month, date information deleted) |
| | Partially Delete Identifier | Method of deleting part of corresponding identifier | 78, Garakbon-dong, Songpa-gu, Seoul | Songpa-gu, Seoul |
| | Reducing Records | Method of reducing all records clearly different from other information | 213 cm | Deleted |
| | Delete all Identification Elements | Method of deleting even potential identification element in addition to identifier | Lee Beom-Soo, case number, father (Lee-Man seok) | Delete all in addition to name |
| Data Suppression | Hiding | Method of conversion into average or category value of data | Infection group specific person "A" | Specific person "A" |
| | Random Rounding | Method of rounding up or rounding down based on given number | Age 45 | Forties |
| | Data Range | Method of expression into range or interval based on given number | 33 million Korean won | 30 – 40 million Korean won |
| | Controller Rounding | Method of matching unmatched sum of row and column through control in "random rounding" method | Not used | |
| Data Masking | Adding Random Noise | Method of adding (adding or multiplying) noise, such as given number | 1988-02-04 | 1988-08-04 (6 months added) |
| | Blank and Impute | Method of changing part of or entire specific item into blank or replacement letter ("*", "_", etc) | 010-555-2580 | 010-*-** |

REAL-TIME ARCHIVING METHOD AND SYSTEM BASED ON HYBRID CLOUD

CROSS REFERENCE TO RELATED APPLICATION

This application claims priority under 35 U.S.C. § 119 to Korean Patent Application No. 10-2020-0001413 filed on Jan. 6, 2020, and Korean Patent Application No. 10-2020-0108750 filed on Aug. 27, 2020, which is incorporated herein by reference in its entirety.

BACKGROUND OF THE INVENTION

1. Technical Field

The following description relates to a real-time archiving method and system based on a hybrid cloud.

2. Description of the Related Art

Recently, there is an increasing need for research of data archiving due to the tightening of data-related regulations, the growth of the medical industry, an increase in the importance of data storage management for patients, and an increase of an interest in data management within a company. For example, from a viewpoint of data-related regulations, data, such as financial transaction data and medical information, must be stored for several years or several tens of years for the protection of consumer rights according to laws. Accordingly, data needs to be stored for a long period due to a variety of types of data-related regulations. Furthermore, in the medical industry field, the amount of medical image data is increased as dependency on image diagnosis is increased. Accordingly, there is an increasing need for an archiving system for increased data management, including storage and backup demands for the storage and management of data. Furthermore, from a viewpoint of data management within a company, a function for protecting and managing important data in security, in addition to a task for storing, in a server, a large amount of data transmitted and received within a company and recovering and backing up data stored in the server in real time, becomes important. From a viewpoint of the automation of manufacturing business, in general, labor-intensive manufacturers were moved to low-cost countries, such as China and India. However, with the recent development of the robot technology, process automation is accelerated by constructing a convergence type robot factory having production efficiency and improved quality.

As the fourth industrial revolution era comes, the big data field has been in the spotlight. However, in Korea, the big data field is chiefly concentrated on infrastructure investment, such as servers, storages, and networks. In the future, however, it is necessary to expand a development opportunity toward the software and service fields by distributing the investment in the infrastructure through archiving technology development. Accordingly, there is an increasing need for the development of an archiving technology having a high data compression ratio, a high compression speed and fast data query compared to a conventional technology.

PRIOR ART DOCUMENT

Korean Patent Application Publication No. 10-2014-0072929 (Jun. 16, 2014) entitled "Automated Method for Performing Archiving Process"

SUMMARY OF THE INVENTION

Embodiments may provide a data archiving method and apparatus capable of providing a remote near-line data archiving function, by receiving remote function invoking from a target system in which data is stored, providing the target system with a first function for archiving, in a storage system, at least some of the data stored in the target system over a network in response to the remote function invoking, and providing the target system with a second function for the query of the data archived in the storage system over the network.

In an aspect, there is provided a data archiving method performed by a computer device including at least one processor, including receiving, by the at least one processor, remote function invoking from a target system in which data is stored, providing, by the at least one processor, the target system with a first function for archiving, in a storage system, at least some of the data stored in the target system over a network in response to the remote function invoking, and providing, by the at least one processor, the target system with a second function for the query of the data archived in the storage system over the network.

According to an aspect, providing the first function may include providing a function for compressing at least some of the data stored in a local database of the target system and archiving the compressed data in a table of the local database.

According to another aspect, providing the first function may include providing a function for compressing at least some of the data stored in a local database of the target system and archiving the compressed data in a table of an external database of the target system.

According to still another aspect, providing the first function may include providing a function for compressing, in a file form, at least some of the data stored in a local database of the target system and archiving the compressed data in a repository included in an external system of the target system.

According to still another aspect, providing the first function may include a (1-1)-th function for controlling the target system to determine a partition for a data record included in a table of a local database of the target system based on sorting information of the data record, a (1-2)-th function for controlling the target system to generate a compression partition by compressing a data record for each partition, a (1-3)-th function for controlling the target system to associate and store, in a compression table, the compression partition and a storage key to uniquely identify the compression partition, and a (1-4)-th function for controlling the target system to associate and store the storage key and the sorting information in an index table of the local database.

According to still another aspect, the sorting information may include a given field value of a corresponding data record. The (1-4)-th function may control the target system to associate and store the storage key and the given field value in a group index table of the local database.

According to still another aspect, the sorting information may include information on time of a corresponding data record. The (1-4)-th function may control the target system to associate and store the storage key and the information on time in a period index table.

According to still another aspect, Providing the first function may further include providing a (1-5)-th function for controlling the target system to associate and store, in a key index table, a primary key, key index information, that is, a location of a corresponding data record within a compression partition compressed to include the corresponding data record, and a storage key corresponding to the compression partition compressed to include the corresponding data record, with respect to each of data records included in the table.

According to still another aspect, with respect to a second compression partition generated by compressing a data record in a connection table connected to the table through the primary key, the (1-5)-th function may control the target system to search for a data record having the same primary key as the data record included in the table, among data records included in the second compression partition and to store subindex information, that is, a location of the retrieved data record within the second compression partition, with respect to the data record having the same primary key in the key index table.

According to still another aspect, providing the first function may further include providing a (1-6)-th function for controlling the target system to delete the compressed data record from the table.

According to still another aspect, providing the first function may further include providing a (1-7)-th function for controlling the target system to search the index table for a storage key associated with identification information included in a restoration request in response to the restoration request for the deleted data record, search the compression table for a compression partition associated with the retrieved storage key, restore the deleted data record by decompressing the retrieved compression partition, and record the restored data record on the table based on the identification information.

According to still another aspect, the (1-2)-th function may control the target system to generate the compression partition by compressing a data record included in the determined partition into a binary object.

According to still another aspect, providing the second function may include providing a (2-1)-th function for controlling the target system to receive a search condition including sorting information of a data record, a (2-2)-th function for controlling the target system to search, for a storage key associated with the sorting information included in the search condition, an index table in which sorting information of a data record and a storage key to uniquely identify a compression partition including a corresponding data record are associated and stored in a local database of the target system, and a (2-3)-th function for controlling the target system to search, for a compression partition associated with the retrieved storage key, a compression table in which a storage key and a compression partition are associated and stored.

According to still another aspect, the data archiving method may further include providing the target system with a third function for managing a lifespan cycle of the data archived in the storage system over the network.

According to still another aspect, providing the third function may include a (3-1)-th function for controlling the target system to archive and retain, in a file form, data compressed and managed in a table of a database, when a retention period of the data archived in the storage system elapses and a (3-2)-th function for controlling the target system to delete the data archived in the file form.

There is provided a computer program stored in a computer-readable recording medium in order to execute the method in a computer device in association with the computer device.

There is provided a computer-readable recording medium in which a program for executing the method in a computer device is written.

There is provided a computer device including at least one processor implemented to execute a computer-readable instruction. The at least one processor is implemented to receive remote function invoking from a target system in which data is stored, provide the target system with a first function for archiving, in a storage system, at least some of the data stored in the target system over a network in response to the remote function invoking, and provide the target system with a second function for the query of the data archived in the storage system over the network.

BRIEF DESCRIPTION OF THE DRAWINGS

FIG. 8 is a diagram illustrating an example of the structure of a period index table according to an embodiment of the present disclosure.

FIG. 9 is a diagram illustrating an example of the structure of a group index table according to an embodiment of the present disclosure.

FIG. 11 is a diagram illustrating an example of the structure of an index table having a form in which the period index table and the group index table are combined in an embodiment of the present disclosure.

FIG. 19 is a diagram illustrating an example of a method of non-identifying data in an embodiment of the present disclosure.

DETAILED DESCRIPTION

Figure 1:
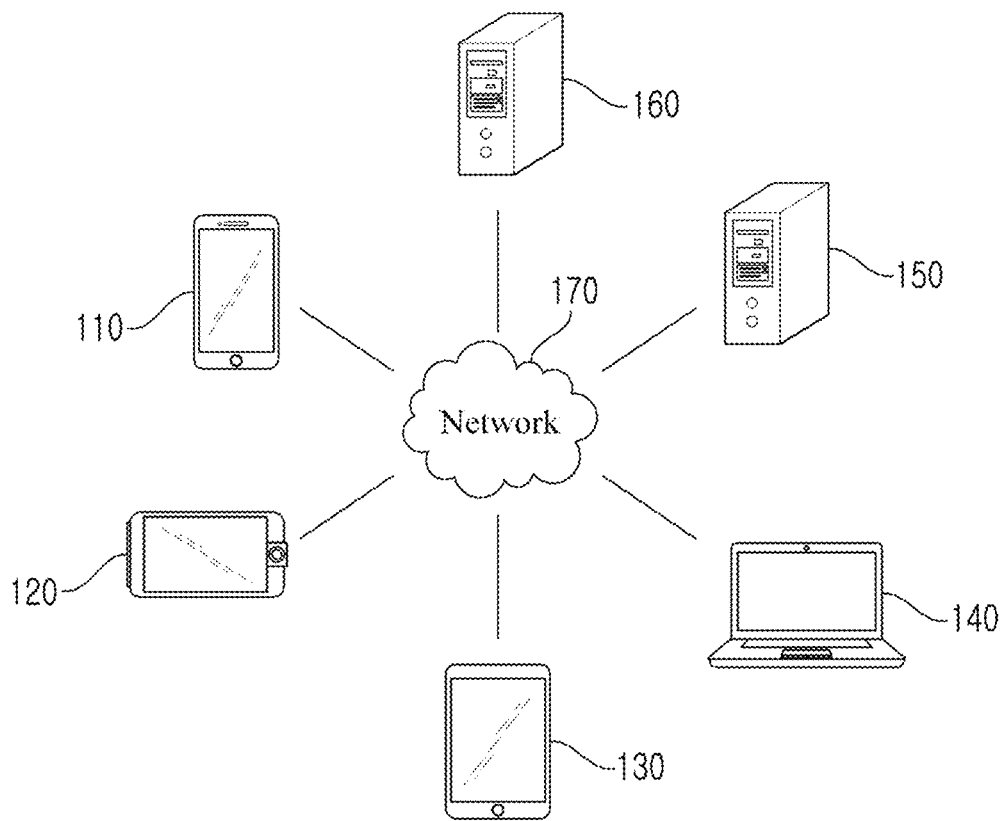
FIG. 1 is a diagram illustrating an example of a network environment according to an embodiment of the present disclosure.

The present disclosure may be changed in various ways and may have various embodiments, and specific embodiments are illustrated in the drawings and described in detail. It is however to be understood that the present disclosure is not intended to be limited to the specific disclosure and that the present disclosure includes all changes, equivalents and substitutions which fall within the spirit and technological scope of the present disclosure. In the drawings, similar elements are assigned similar reference numerals.

Terms, such as a first, a second, A, and B, may be used to describe various elements, but the elements should not be restricted by the terms. The terms are used to only distinguish one element from the other element. For example, a first element may be named a second element without departing from the scope of rights of the present disclosure. Likewise, a second element may be named a first element. The term "and/or" includes a combination of a plurality of related and illustrated items or any one of a plurality of related and described items.

When it is said that one element is "connected" or "coupled" to the other element, it should be understood that one element may be directly connected or coupled" to the other element, but a third element may exist between the two elements. In contrast, when it is described that one element is "directly connected" or "directly coupled" to the other element, it should be understood that a third element does not exist between the two elements.

The terms used in this application are used to only describe specific embodiments and are not intended to restrict the present disclosure. An expression of the singular number should be construed as including an expression of the plural number unless clearly defined otherwise in the context. It is to be understood that in this application, a term, such as "include (or comprise)" or "have", is intended to designate that a characteristic, number, step, operation, element or part which is described in the specification or a combination of them are present and does not exclude the existence or possible addition of one or more other characteristics, numbers, steps, operations, elements, parts or combinations of them in advance.

All the terms used herein, including technical terms or scientific terms unless defined otherwise in the specification, have the same meanings as those commonly understood by a person having ordinary skill in the art to which the present disclosure pertains. Terms, such as those commonly used and defined in dictionaries, should be construed as having the same meanings as those in the context of a related technology, and should not be construed as having ideal or excessively formal meanings unless explicitly defined otherwise in the specification.

Hereinafter, embodiments are described in detail with reference to the accompanying drawings.

A data archiving system according to embodiments of the present disclosure may be implemented by at least one computer device. A data archiving method according to embodiments of the present disclosure may be performed through at least one computer device included in the data archiving system. A computer program according to an embodiment of the present disclosure may be installed and driven in the computer device. The computer device may perform the data archiving method according to embodiments of the present disclosure under the control of the driven computer program. The computer program may be stored in a computer-readable recording medium in order to execute the data archiving method in the computer device in association with the computer device.

FIG. 1 is a diagram illustrating an example of a network environment according to an embodiment of the present disclosure. The network environment of FIG. 1 illustrates an example including a plurality of electronic devices 110, 120, 130, and 140, a plurality of servers 150 and 160, and a network 170. FIG. 1 is an example for a description of an invention, and the number of electronic devices or the number of servers is not limited to FIG. 1. Furthermore, the network environment of FIG. 1 merely describes one of environments which may be applied to the present embodiments, and an environment which may be applied to the present embodiments is not limited to the network environment of FIG. 1.

The plurality of electronic devices 110, 120, 130 and 140 may be stationary devices or mobile devices implemented as computer devices. The plurality of electronic devices 110, 120, 130 and 140 may include a smartphone, a mobile phone, a navigation device, a computer, a laptop computer, a device for digital broadcasting, personal digital assistants (PDA), a portable multimedia player (PMP), and a tablet PC, for example. For example, in FIG. 1, a shape of a smartphone is illustrated as being an example of the electronic device 110. However, in embodiments of the present disclosure, the electronic device 110 may mean one of various physical computer devices capable of communicating with other electronic devices 120, 130 and 140 and/or the servers 150 and 160 over the network 170 substantially using a wireless or wired communication method.

The communication method is not limited, and may include short-distance wireless communication between devices in addition to communication methods using communication networks (e.g., a mobile communication network, wired Internet, wireless Internet and a broadcasting network) which may be included in the network 170. For example, the network 170 may include one or more given networks of a personal area network (PAN), a local area network (LAN), a campus area network (CAN), a metropolitan area network (MAN), a wide area network (WAN), a broadband network (BBN), and the Internet. Furthermore, the network 170 may include one or more of network topologies, including a bus network, a star network, a ring network, a mesh network, a star-bus network, and a tree or hierarchical network, but is not limited thereto.

Each of the servers 150 and 160 may be implemented as a computer device or a plurality of computer devices, which provides an instruction, a code, a file, content, or a service through communication with the plurality of electronic devices 110, 120, 130 and 140 over the network 170. For example, the server 150 may be a system that provides a service (e.g., an archiving service, a file distribution service, a map service, a content provision service, a group call service (or a voice conference service), a messaging service, a mail service, a social network service, a translation service, a financial service, a payment service, and a search service).

Figure 2:
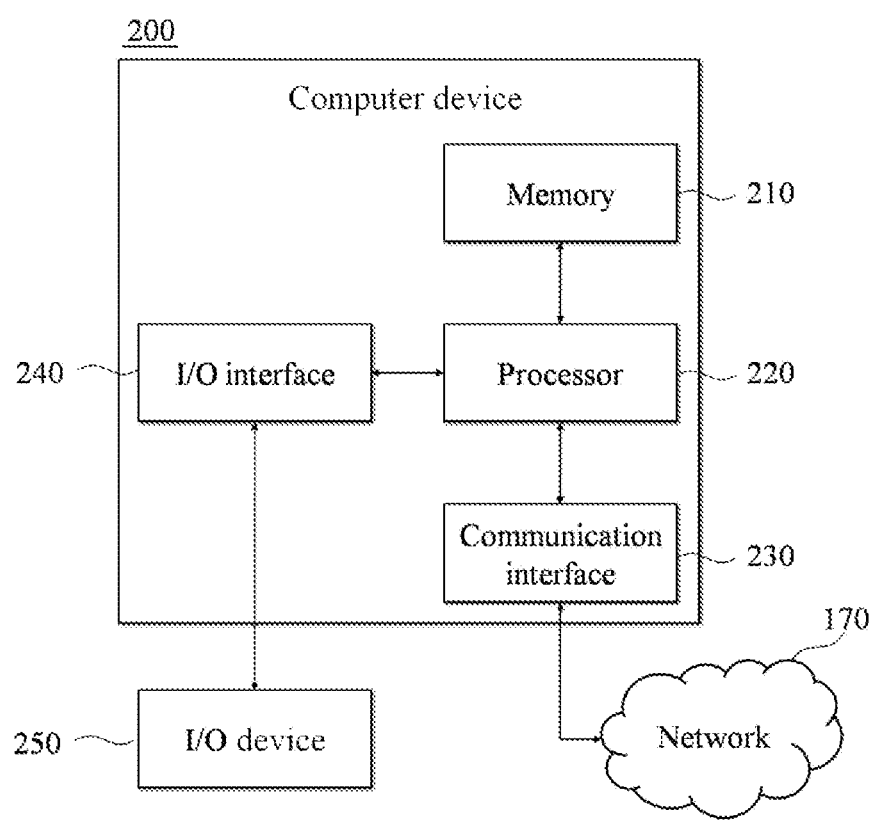
FIG. 2 is a block diagram illustrating an example of a computer device according to an embodiment of the present disclosure.

FIG. 2 is a block diagram illustrating an example of a computer device according to an embodiment of the present disclosure. Each of the plurality of electronic devices 110, 120, 130 and 140 or each of the servers 150 and 160 may be implemented by a computer device 200 illustrated in FIG. 2.

As illustrated in FIG. 2, the computer device 200 may include a memory 210, a processor 220, a communication interface 230, and an input/output (I/O) interface 240. The memory 210 is a computer-readable recording medium, and may include permanent mass storage devices, such as a random access memory (RAM), a read only memory (ROM) and a disk drive. In this case, the permanent mass storage device, such as a ROM and a disk drive, may be included in the computer device 200 as a permanent storage device separated from the memory 210. Furthermore, an operating system and at least one program code may be stored in the memory 210. Such software elements may be loaded from a computer-readable recording medium, separated from the memory 210, to the memory 210. Such a separate computer-readable recording medium may include computer-readable recording media, such as a floppy drive, a disk, a tape, a DVD/CD-ROM drive, and a memory card. In another embodiment, software elements may be loaded onto the memory 210 through the communication interface 230 not a computer-readable recording medium. For example, the software elements may be loaded onto the memory 210 of the computer device 200 based on a computer program installed by files received over the network 170.

The processor 220 may be configured to process instructions of a computer program by performing basic arithmetic, logic and I/O operations. The instructions may be provided to the processor 220 by the memory 210 or the communication interface 230. For example, the processor 220 may be configured to execute received instructions based on a program code stored in a recording device, such as the memory 210.

The communication interface 230 may provide a function for enabling the computer device 200 to communicate with other devices (e.g., the aforementioned storage devices) over the network 170. For example, a request, an instruction, data or a file generated by the processor 220 of the computer device 200 based on a program code stored in a recording device, such as the memory 210, may be provided to other devices over the network 170 under the control of the communication interface 230. Inversely, a signal, an instruction, data or a file from another device may be received by the computer device 200 through the communication interface 230 of the computer device 200 over the network 170. The signal, instruction or data received through the communication interface 230 may be transmitted to the processor 220 or the memory 210. The file received through the communication interface 230 may be stored in a storage device (i.e., the aforementioned permanent storage device) which may be further included in the computer device 200.

The I/O interface 240 may be means for an interface with an I/O device 250. For example, the input device may include a device, such as a microphone, a keyboard, or a mouse. The output device may include a device, such as a display or a speaker. For another example, the I/O interface 240 may be means for an interface with a device in which functions for input and output have been integrated into one, such as a touch screen. The I/O device 250, together with the computer device 200, may be configured as a single device.

Furthermore, in other embodiments, the computer device 200 may include elements greater or smaller than the elements of FIG. 2. However, it is not necessary to clearly illustrate most of conventional elements. For example, the computer device 200 may be implemented to include at least some of the I/O devices 250 or may further include other elements, such as a transceiver and a database.

Figure 3:
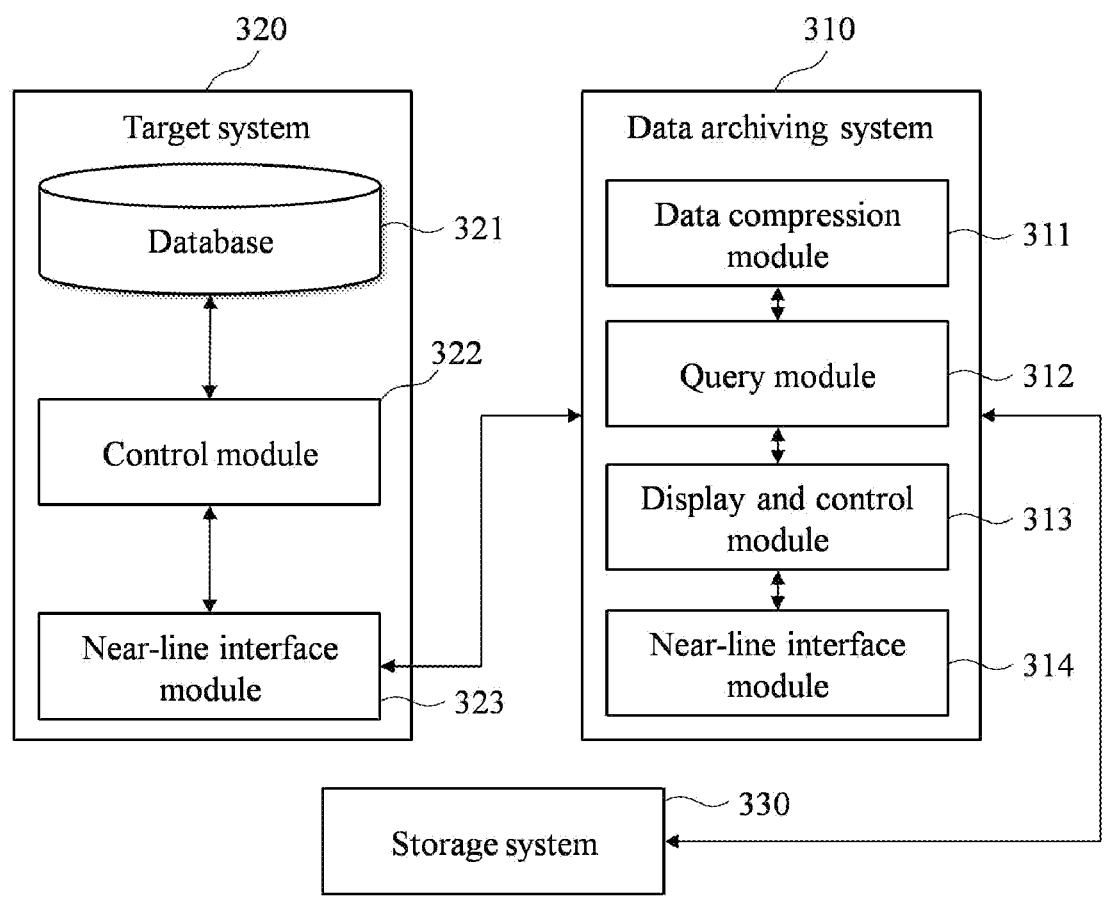
FIG. 3 is a diagram illustrating a schematic shape of a computer system for archiving in an embodiment of the present disclosure.

FIG. 3 is a diagram illustrating a schematic shape of a data archiving system 310 in an embodiment of the present disclosure.

The data archiving system 310 may be implemented by a physical device or by a combination of a plurality of physical devices, such as the computer device 200 described with reference to FIG. 2, and may include a data compression module 311, a query module 312, a display and control module 313, and a near-line interface module 314 as illustrated in FIG. 3. Each of the data compression module 311, the query module 312, the display and control module 313 and the near-line interface module 314 may be functional expressions of operations performed by the processor 220 of the computer device 200 that implements the data archiving system 310 based on a code of an archiving solution program installed in the data archiving system 310.

For example, the archiving solution program may include a code for providing a data compression function. The processor 220 may provide the data compression function through such a code. In this case, the "data compression module 311" may be used as a functional expression of an operation(s) for providing the data compression function of the processor 220.

In other words, the data archiving system 310 may be implemented as the archiving solution program is installed and driven in the computer device 200. For example, the archiving solution program may be developed as a cloud software as a service (SaaS) type product and registered as cloud systems of various cloud vendors. The archiving solution program may provide functions for archiving to a target system 320 to be described later. For another example, the data archiving system 310 may be implemented in the form of an appliance server in which a remote near-line data archiving technology (e.g., the archiving solution program) and hardware are integrated. The appliance server may provide the maintenance of continuous product quality and price competitiveness due to easy and fast delivery and repair and maintenance.

The target system 320 may also be implemented by a physical device or a combination of a plurality of physical devices, such as the computer device 200 described with reference to FIG. 2, and may include a database 321, a control module 322 and a near-line interface module 323 as illustrated in FIG. 3. The control module 322 and the near-line interface module 323 may also be functional expressions of operations performed by the processor 220 of the computer device 200 that implements the target system 320.

The data archiving system 310 and the target system 320 may communicate with each other over a network (e.g., the network 170 described with reference to FIGS. 1 and 2). The target system 320 may invoke a function, provided by the data archiving system 310, through the near-line interface module 323 under the control of the control module 322. In this case, the data archiving system 310 may provide the target system 320 with the function invoked by the target system 320. For example, the target system 320 may be an integrated information system for enterprise resource planning (ERP). The near-line interface module 323 may be based on a remote function call (RFC) for SAP ERP, for example.

Figure 4:
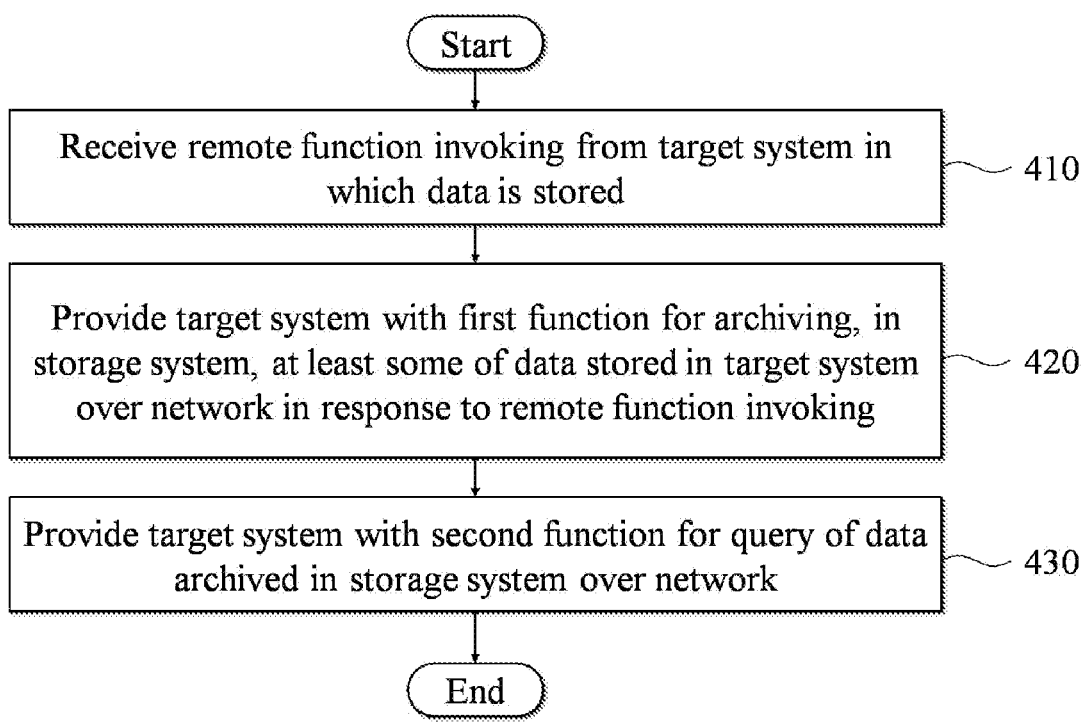
FIG. 4 is a flowchart illustrating an example of a data archiving method according to an embodiment of the present disclosure.

FIG. 4 is a flowchart illustrating an example of a data is archiving method according to an embodiment of the present disclosure. The data archiving method according to the present embodiment may be performed by the computer device 200 that implements the data archiving system 310. In this case, the processor 220 of the computer device 200 may be implemented to execute a control instruction according to a code of an operating system or a code of at least one computer program, which is included in the memory 210. In this case, the processor 220 may control the computer device 200 to perform steps 410 to 440 of the method of FIG. 4 based on the control instruction provided by the code stored in the computer device 200. Furthermore, the computer program may correspond to the aforementioned archiving solution program.

At step 410, the computer device 200 may receive remote function invoking from a target system in which data is stored. In this case, the target system may correspond to the target system 320 described with reference to FIG. 3. The remote function invoking may be generated through the near-line interface module 323 of the target system 320.

At step 420, the computer device 200 may provide the target system with a first function for archiving, in a storage system, at least some of the data stored in the target system over the network in response to the remote function invoking.

For example, referring back to FIG. 3, the data archiving system 310 may provide the target system 320 with the first function for archiving at least some of data, stored in the database 321 of the target system 320, in a storage system 330 over the network in response to the invoking of the target system 320.

In this case, in some embodiments, the storage system 330 may be a local database (e.g., the database 321) included in the target system 320 or may be an external database of the target system 320 and/or a repository included in an external system (e.g., a file server or a cloud server) of the target system 320.

For example, the data archiving system 310 may provide, as the first function, a function for compressing at least some of the data stored in the database 321 of the target system 320 and archiving the compressed data in a table of the database 321. In this case, an archiving speed is fast and a data query speed can also be increased because the compressed data is not stored in the form of a file, but is stored in a table of the database 321 of the target system 320.

For another example, the data archiving system 310 may provide, as the first function, a function for compressing at least some of the data stored in the database 321 of the target system 320 and archiving the compressed data in a table of the external database of the target system 320. For example, from a viewpoint of the data archiving system 310, assuming that the target system 320 is a client, the data archiving system 310 may store the compressed data in a table of a database included in another client.

For another example, the data archiving system 310 may provide, as the first function, a function for compressing at least some of the data stored in the database 321 of the target system 320 in the form of a file and archiving the compressed data in a repository included in the external system of the target system 320. For example, if the data archiving system 310 is implemented within a cloud system, the data archiving system 310 may store, in the repository of the cloud system, a file including compressed data.

As a more detailed example, the data archiving system 310 may provide the target system 320 with a user interface for providing retention period management, archiving configuration, archiving execution, monitoring, data query and data management functions for archiving services through the display and control module 313.

In this case, when the execution of archiving is requested through the user interface provided through the display and control module 313, the data archiving system 310 may provide the target system 320 with the first function for archiving, in the storage system 330, at least some of the data stored in the database 321 of the target system 320 based on an archiving configuration configured through the data compression module 311. In other words, the target system 320 may archive, in the storage system 330, at least some of the data stored in the database 321 using the first function provided by the data archiving system 310.

At step 430, the computer device 200 may provide the target system with a second function for the query of the data archived in the storage system over the network. The second function may also be provided by remote function invoking from the target system.

For example, referring back to FIG. 3, the data archiving system 310 may provide the target system 320 with the second function for the query of the data archived in the storage system 330 over the network in response to the invoking of the target system 320.

If a data query provided through the display and control module 313 is requested through a user interface, the data archiving system 310 may provide the target system 320 with the second function for the query of the data archived in the storage system 330 through the query module 312. In other words, the target system 320 may inquire the storage system 330 about the archived data using the second function provided by the data archiving system 310.

As described above, the target system 320 can archive data stored in the database 321 using a function provided by the data archiving system 310 without a need to add separate hardware.

As described above, the first function provided by the data archiving system 310 may include a function for storing and retaining compressed data in a table of a database (e.g., the database 321 or external database of the target system 320) or retaining the compressed data in the form of a file. In this case, the archive data compressed and retained in the table of the database increases the volume of the database as data. Accordingly, the data archiving system 310 may manage a data lifespan cycle. For example, the data archiving system 310 may manage the data lifespan cycle based on a procedure of "database→data compression archive→file archive→archive dispersion." In this case, the "database" may mean that data is managed in the state in which the data has been stored in the database 321 of the target system 320. Furthermore, the "data compression archive" may mean that the data is compressed and managed in a table of a database (e.g., the database 321 or external database of the target system 320) in the state in which the data has been compressed. Furthermore, the "file archive" may mean that when the retention period of the compressed data elapses, the data managed in the state in which the data has been compressed and managed in the table of the database is archived and retained in the form of a file. The "archive dispersion" may mean that data no longer meaningful to be retained among the archived data in the form of a file is deleted.

The "file archive" may be performed in the repository of the target system 320, but may be performed in the repository of an external system of the target system 320. As a more detailed example, the data archiving system 310 may access the target system 320 from which the extraction of a compression target has been completed in order to transmit the archive data to a cloud system outside the target system 320. In this case, the data archiving system 310 may invoke the target system through the near-line interface module 314. Such invoking may be based on an API call. Since the compressed data may be stored in various types of storages, the compressed data may be implemented to be connected to various types of storages, such as a database, a disk, a file, an in-memory, a quantum memory, NoSQL, a graph-DB, and a blockchain database. The data archiving system 310 may define a transmission scenario depending on a business type, such as finance, a production cost, production, sales, materials, quality, or a system. In some embodiments, the data archiving system 310 may generate a small group of transmission scenarios by considering a network bandwidth. Furthermore, the data archiving system 310 may allocate an object to a transmission scenario. If a small group of transmission scenarios is present, the data archiving system 310 may allocate an object from which extraction has been completed to the small group of transmission scenarios. Furthermore, the data archiving system 310 may convert the extraction object into a binary object, and may configure a present transmission history status table for an object capacity and a quantity for each transmission scenario and/or each small group. Furthermore, the data archiving system 310 may perform transmission simulations. In this case, the data archiving system 310 may sort a simulation target for each transmission scenario and/or each small group, may execute transmission simulations, may check a transmission time for each object, and may predict an optimum time in subsequent transmission for each object data ratio. After the transmission simulations, the data archiving system 310 may execute actual data transmission using scenario information, small group information and/or object information. In this case, the data archiving system 310 may optimize a total end time by arranging a small group and/or an object having the shortest time based on a small group and/or an object having the longest transmission time based on transmission simulation information. In this case, the data archiving system 310 may classify and store data storage locations for each data character, and may check the number of transmission and an execution time in real time through a transmission situation monitoring tool. Furthermore, the data archiving system 310 may update a transmission execution map with an extraction situation, and may maintain the speed and integrity by performing such a process from a turn after completion when an error occur. The transmission of the data may be performed by selecting a streaming method or object unit transmission. Furthermore, the data archiving system 310 may check whether the transmission of data for each scenario and/or each small group from the target system 320 to the storage system 330 has been completed, and may verify the process of transmitting archive data by comparing the transmitted data and an object capacity and a present execution status table for each transmission scenario and/or each small group. In this case, the transmission of the data may be performed in a 1:1 relationship or may be simultaneously transmitted to different servers having a 1:N relationship. In this case, a present transmission history status table may be configured for each server.

Figure 5:
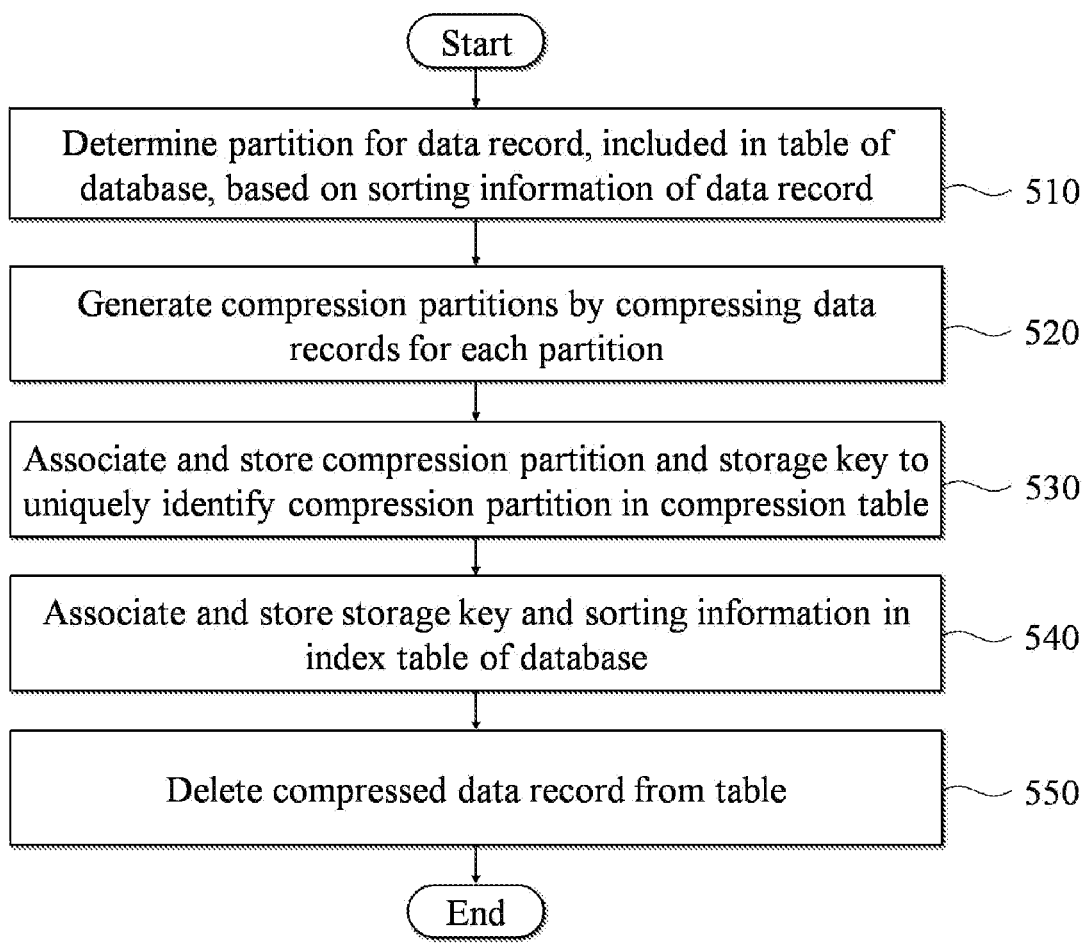
FIG. 5 is a flowchart illustrating an example of a process of archiving data using a first function in an embodiment of the present disclosure.

FIG. 5 is a flowchart illustrating an example of a process of archiving data using the first function in an embodiment of the present disclosure. The process according to the present embodiment may be performed by the computer device 200 that implements the target system 320 using the first function provided by the data archiving system 310. In this case, the processor 220 of the computer device 200 may be implemented to execute a control instruction according to a code of an operating system or a code of at least one computer program, which is included in the memory 210. In this case, the processor 220 may control the computer device 200 to perform steps 510 to 550 of the method of FIG. 5 based on the control instruction provided by the code stored in the computer device 200. In this case, the code may include a code for the first function provided by the data archiving system 310.

At step 510, the computer device 200 may determine a partition for a data record, included in a table of a database, based on sorting information of the data record. In this case, the database may correspond to the database 321 of the target system 320 described with reference to FIG. 3. The sorting information may include information on time for the data record and/or a given field value of the data record. The computer device 200 may determine the partition for the data record based on the information on time and/or the field value. A table is a unit that forms a basic structure in which data is stored in a database. The table described at step 510 may be a table to be archived in order to reduce a capacity among a plurality of tables included in the database.

For example, the computer device 200 may sort, as one partition, data records each having a field value within a given range. In this case, the field value may be determined as a field value of a field that has be most frequently searched for in the table. The reason for this is that when archived data is subsequently searched for, efficiency of search can be maximized using index information generated based on a corresponding field value. For another example, the computer device may sort, as one partition, data records each having information on time within a given range.

Furthermore, the partition may be configured with a set of data records sorted among all data records included in the table. At least one partition may be generated. A partition may be generated with respect to only some data records not the entire table, if necessary. For example, a partition for archiving may be generated with respect to only data records prior to the year of 2015 except data records after the year of 2015 in a table.

The number of data records included in one partition may be determined by comprehensively analyzing and reviewing a total number of records included in a table, performance of a computer that searches a database, a search condition having high frequency in a database, etc.

In another embodiment, if there is a partition that belongs to the sorted partitions and in which the number of data records exceeds a threshold, the exceeding partition may be separated into a plurality of partitions each having the number of records which is the threshold or less. For example, a threshold, that is, the number of data records which may be included in one partition may be set to 100,000. However, if a sorted partition includes the number of data records exceeding the threshold, this may be problematic because it may cause overload and inefficiency of a computer. Accordingly, if one partition includes data records exceeding 100,000, several partitions may be generated by separating the one partition into a plurality of partitions each having the 100,000 unit. For example, if one partition includes 250,000 data records, the computer device 200 may separate the one partition into a total of three partitions, including two partitions each having 100,000 data records and a partition having 50,000 data records.

There may be no method of distinguishing between the plurality of partitions separated as described above because the plurality of partitions has been classified based on a classification criterion according to the same field value. Accordingly, serial numbers (e.g., 1, 2, 3, and 4 may be assigned to a plurality of record groups, respectively, and may be further stored in the serial number field of an index table. In this case, even when archived data is searched for, search may be performed by distinguishing between the plurality of separated partitions. Such a serial number may correspond to a sequence to be described later.

At step 520, the computer device 200 may generate compression partitions by compressing the data records for each partition. For example, the computer device 200 may generate a compression partition by compressing data records, included in a determined partition, into a binary object.

For example, in order to generate a compression partition, first, the computer device 200 may store, in a buffer, data records to be included in the compression partition. The size of the buffer in which the data records are stored may be determined based on a structure (e.g., the number, type and size of fields) of a table and the thresholds of the data records to be included in the compression partition. For example, assuming that a table includes a total of three fields of DATE (text 8 letters), NAME (text 30 letters) and AGE (integer 4 bytes) and a threshold for the number of data records included in a compression partition is 100,000, when text 1 letter is calculated as 2 bytes, the size of a buffer may be at least 100,000*(8*2+30*2+4)=800,000 bytes (about 8 mega bytes). In this case, the computer device 200 may sequentially read all the data records included in the compression partition and field values of the data records, and may sequentially the data records and the field values in the buffer.

Thereafter, the computer device 200 may generate a compression partition by compressing data stored in the buffer. The compression partition may be the results of a binary object form generated by compressing the data stored in the buffer. In this case, ZIP, CTW, LZ77, LZW, gzip, bzip2, or DEFLATE, that is, a lossless compression algorithm, may be used so that a loss attributable to the compression does not occur.

In this case, the computer device 200 may generate a storage key uniquely assigned to each generated compression partition.

At step 530, the computer device 200 may associate the compression partition and the storage key to uniquely identify the compression partition and store them in the compression table. As described above, the compressed data may be stored in a table of the database 321 of the target system 320 or a table of the external database of the target system 320. The compression table may include a field for storing the compression partition generated by compression for each partition and a field for storing the storage key uniquely assigned to correspond to the corresponding compression partition. The storage key is a key including a value uniquely assigned to each compression partition. A value of a storage key shared by compression partitions may be stored in a field of the compression table corresponding to the storage key. Furthermore, one or more fields may correspond to a storage key. When values of storage keys distributed and stored in one or more fields are combined, a unique storage key may be implemented for each compression partition.

At step 540, the computer device 200 may associated and store the storage key and the sorting information in the index table of the database. For example, if the sorting information includes a given field value of a corresponding data record, at step 540, the computer device 200 may associate and store the storage key and the given field value in a group index table. The storage key and the field value included in the group index table may be used as an index for searching for a compressed and stored data record according to a search condition including the given field value. For another example, if the sorting information includes information on time of a data record, the computer device 200 may associate and store the storage key and the information on time in a period index table. The storage key and the information on time included in the period index table may be used as an index for searching for a compressed and stored data record according to a search condition including information on a given time. In other words, the index table including the group index table and/or the period index table may be used to obtain a storage key corresponding to a field value and/or information on time included in a search condition. The storage key may be used to obtain a compression partition corresponding to the storage key in the compression table.

At step 550, the computer device 200 may delete the compressed data record from the table. An object of compressing and archiving a database is to reduce the storage space of the database. Accordingly, the computer device 200 can reduce the storage space of the database by deleting archived data records from the table. However, in some embodiments, a compressed data record may not be directly deleted from the table, and may be deleted from the table after a lapse of a given period.

The deleted data record may be subsequently recovered into a corresponding table. For example, the computer device 200 may search the index table for a storage key, associated with identification information including a restoration request, in response to the restoration request for a deleted data record, and may search the compression table for a compression partition associated with the retrieved storage key. Thereafter, the computer device 200 may restore the deleted data record by decompressing the retrieved compression partition, and may record the restored data record on the table based on the identification information. In this case, in order to identify a specific data record that belongs to data records included in the compression partition and whose restoration has been requested, pieces of information of a key index table to be described later may be used.

Steps 510 to 550 may be performed using the first function provided by the data archiving system 310. In other words, the data archiving system 310 may provide the target system 320 with the first function including a function for controlling the target system 320 to perform steps 510 to 550.

Figure 6:
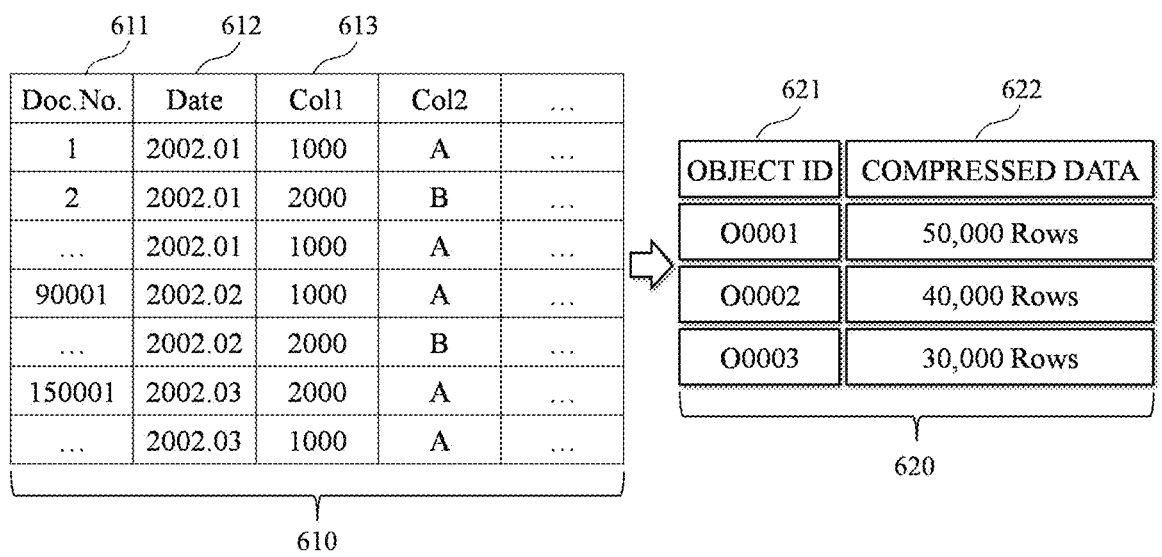
FIG. 6 is a diagram illustrating a first example of the structure of a compression table according to an embodiment of the present disclosure.

FIG. 6 is a diagram illustrating a first example of the structure of a compression table according to an embodiment of the present disclosure. In FIG. 6, a table 610 includes a Doc. No. field 611, a Date field 612 for time, and a Col1 field 613 for a specific attribute. In this case, the computer device 200 may generate a compression partition by sorting and compressing a data record of the table 610 based on a field value of the Date field 612 or a field value of the Col1 field 613 of the table 610, that is, information on time, as sorting information. In this case, the computer device 200 may generate a compression table 620 by associating and storing the compression partition and a storage key for uniquely identifying the corresponding compression partition. For example, the compression table 620 according to the embodiment of FIG. 6 may include an OBJECT ID field 621 having a storage key as a field value and a COMPRESSED DATA field 622 having a compression partition as a field value.

Figure 7:
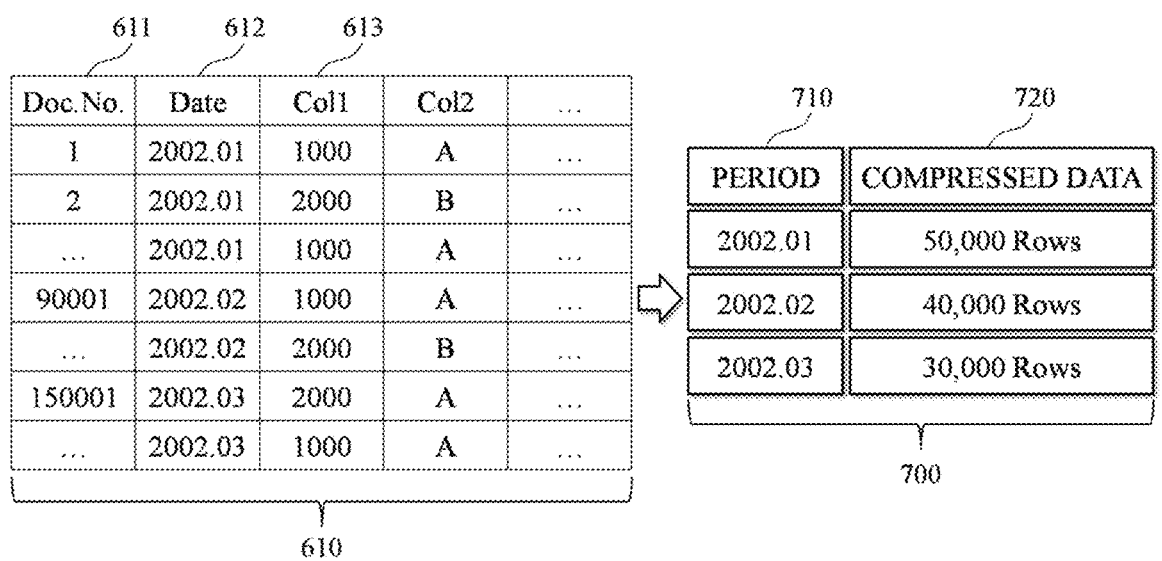
FIG. 7 is a diagram illustrating a second example of the structure of the compression table according to an embodiment of the present disclosure.

FIG. 7 is a diagram illustrating a second example of the structure of a compression table according to an embodiment of the present disclosure. FIG. 8 is a diagram illustrating an example of the structure of a period index table according to an embodiment of the present disclosure. FIG.

9 is a diagram illustrating an example of the structure of a group index table according to an embodiment of the present disclosure.

FIG. 7 describes another embodiment in which a compression table 700 generated through the table 610 described with reference to FIG. 6. For example, the computer device 200 may generate a compression partition by sorting and compressing a data record of the table 610 based on a field value of the Datefield 612 of the table 610, that is, information on time, as sorting information. Furthermore, the computer device 200 may generate the compression table 700 by associating and storing the sorting information and the corresponding compression partition. For example, the compression table 700 according to the embodiment of FIG. 7 may include a PERIOD field 710 having information on time as a field value and a COMPRESSED DATA field 720 having a compression partition as a field value.

FIG. 8 illustrates an example of a period index table 800 which may be generated and used if the compression table 620 includes compression partitions generated by sorting and compressing data records based on field values (i.e., information on time) of the Date field 612. In this case, the period index table 800 may include a PERIOD field 810 having information on time as a field value and an OBJECT ID field 820 having a storage key as a field value. For example, when receiving a search condition including information on time (e.g., "2020.01") as sorting information, the computer device 200 may search the period index table 800 for a storage key (e.g., a storage key "00001" corresponding to information on time "2020.01" in the period index table 800) using information on time included in the search condition, and may search the compression table 620 for a compression partition (e.g., a compression partition "50,000 Rows" corresponding to the storage key "00001" in the compression table 620), corresponding to the storage key, using the retrieved storage key.

Furthermore, FIG. 9 illustrates an example of a group index table 900 including compression partitions generated by sorting and compressing data records based on field values of the Col1 field 613 of the compression table 620. In this case, the group index table 900 may include a PERIOD field 910 having a field value of the Col1 field 613 as its own field value and an OBJECT ID field 920 having a storage key as a field value. For example, when receiving a search condition including a field value (e.g., "1000") of the Col1 field 613 as sorting information, the computer device 200 may search the group index table 900 for a corresponding storage key (e.g., a storage key "00001" corresponding to the field value "1000" in the group index table 900) using the field value included in the search condition, and may search the compression table 620 for a compression partition (e.g., the compression partition "50,000 Rows", corresponding to the storage key "00001", in the compression table 620) corresponding to the storage key using the retrieved storage key.

Figure 10:
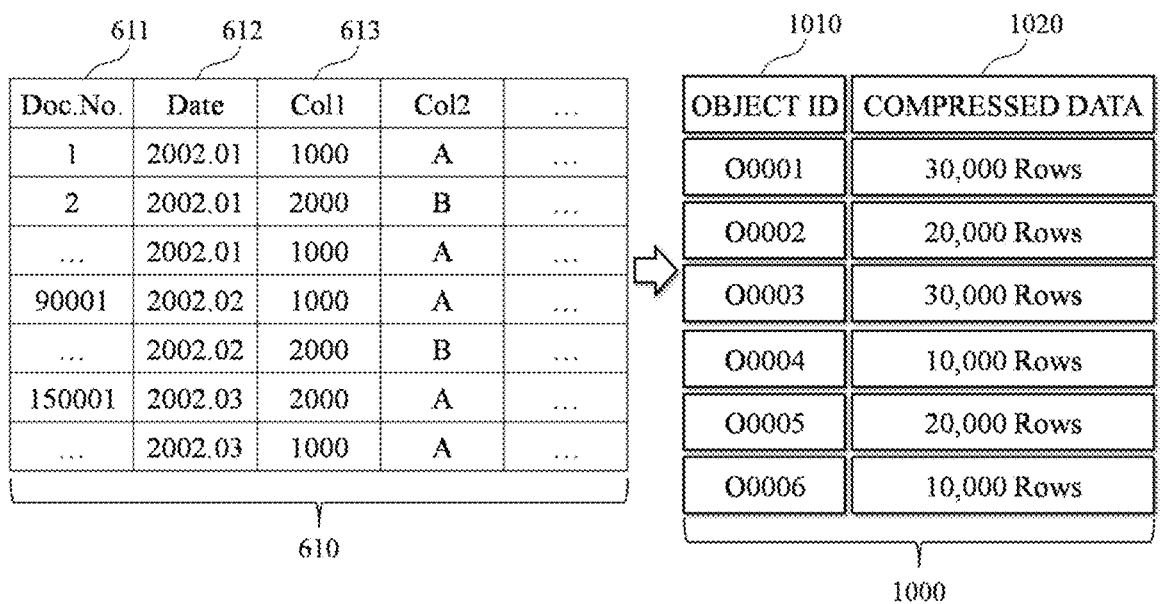
FIG. 10 is a diagram illustrating a second example of the structure of a compression table according to an embodiment of the present disclosure.

FIG. 10 is a diagram illustrating a second example of the is structure of a compression table according to an embodiment of the present disclosure. FIG. 11 is a diagram illustrating an example of the structure of an index table having a form in which the period index table and the group index table are combined in an embodiment of the present disclosure.

FIG. 10 describes another embodiment in which a compression table 1000 is generated through the table 610 described with reference to FIG. 6. For example, the computer device 200 may generate a compression partition by sorting and compressing data records of the table 610 based on two field values, that is, a field value of the Date field 612 and a field value of the Col1 field 613 of the table 610, that is, information on time.

As a more detailed example, the computer device 200 may generate a first compression partition by compressing data records in each of which a field value of the Data field 612 is "2002.01" and a field value of the Col1 field 613 is "1000", may generate a second compression partition by compressing data records in each of which a field value of the Data field 612 is "2002.01" and a field value of the Col1 field 613 is "2000", may generate a third compression partition by compressing data records in each of which a field value of the Data field 612 is "2002.02" and a field value of the Col1 field 613 is "1000", may generate a fourth compression partition by compressing data records in each of which a field value of the Data field 612 is "2002.02" and a field value of the Col1 field 613 is "2000", may generate a fifth compression partition by compressing data records in each of which a field value of the Data field 612 is "2002.03" and a field value of the Col1 field 613 is "1000", and may generate a sixth compression partition by compressing data records in each of which a field value of the Data field 612 is "2002.03" and a field value of the Col1 field 613 is "2000."

In this case, the computer device 200 may generate the compression table 1000 by associating and storing the compression partition and a storage key for uniquely identifying the corresponding compression partition. For example, the compression table 1000 according to the embodiment of FIG. 10 may include an OBJECT ID field 1010 having a storage key as a field value and a COMPRESSED DATA field 1020 having a compression partition as a field value.

FIG. 11 illustrates an example of an index table 1100 having a form in which the period index table and the group index table are combined. In this case, the index table 1100 may include a PERIOD field 1110 having information on time as a field value, a Col1 field 1120 having a field value of the Col1 field 613 as its own field value, and an OBJECT ID field 1130 having a storage key as a field value. For example, when receiving a search condition including information on time (e.g., "2020.02") and a field value (e.g., "1000") of the Col1 field 613 as sorting information, the computer device 200 may search the index table 1100 for a storage key (e.g., a storage key "00003" in the index table 1100) that satisfies both the information on time and the field value included in the search condition, and may search the is compression table 1000 for a compression partition (e.g., the compression partition "30,000 Rows" corresponding to the storage key "00003" in the compression table 1000) corresponding to the storage key using the retrieved storage key.

Figure 12:
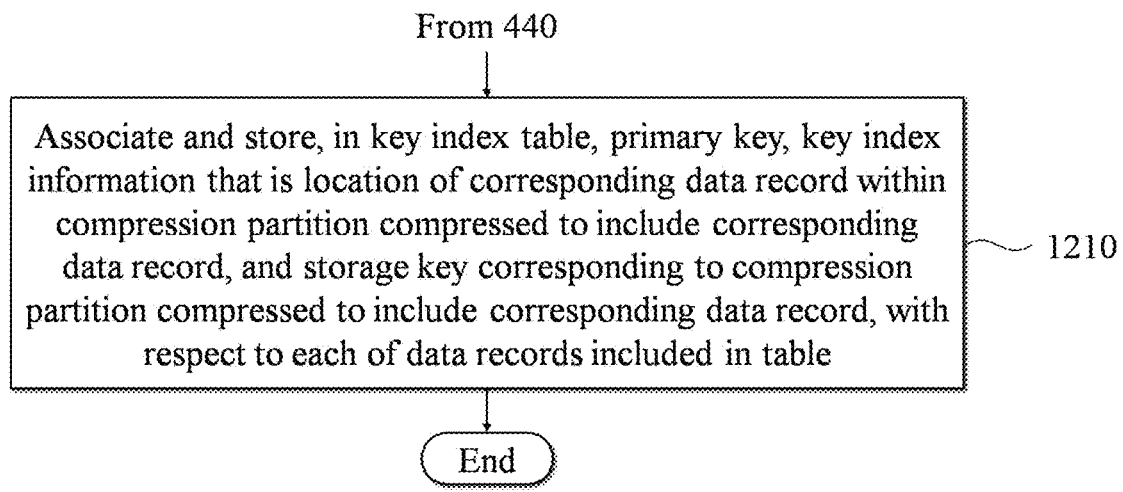
FIG. 12 is a flowchart illustrating another example of a process of archiving data using the first function in an embodiment of the present disclosure.

FIG. 12 is a flowchart illustrating another example of a process of archiving data using the first function in an embodiment of the present disclosure. The process according to the present embodiment may further include step 1210 after step 540 described with reference to FIG. 5.

At step 1210, the computer device 200 may associate and store, in the key index table, a primary key, key index information that is the location of a corresponding data record within a compression partition compressed to include the corresponding data record, and a storage key corresponding to the compression partition compressed to include the corresponding data record, with respect to each of data records included in a table. Step 1210 may be performed using the first function provided by the data archiving system 310. In other words, the data archiving system 310 may provide the target system 320 with the first function including a function for controlling the target system 320 to perform step 1210.

The primary key may mean a corresponding value in a field having a uniquely identified value for each record in the database, and may also be called a basic key, a main key or a unique key. Furthermore, one or more primary keys may be present in one table. Furthermore, the key index information is information on where a data is record having a value of a specific primary key is stored within a compression partition. For example, information on a storage sequence indicating that a data record is stored at a (1000)-th position, among information on 100,000 data records included in a compression partition, may be stored as the key index information.

The reason why the primary key is stored in a key index table is for a table, that is, a search target, can be directly searched for by a corresponding primary key, in addition to another field value and information on time. That is, when a user tries to search the table for a data record having a specific primary key while inputting the specific primary key, the key index table may be used. More specifically, the computer device 200 may search the key index table for key index information and a storage key for a data record having a specific primary key. In this case, the computer device 200 may obtain a compression partition, corresponding to the storage key, from a compression table using the obtained storage key, and may search the compression partition for the data record desired by the user using the key index information. As already described above, such key index information of a key index table may be used to identify a data record having a specific condition, among data records included in a compression partition, in restoring the data record having the specific condition in the table.

Figure 13:
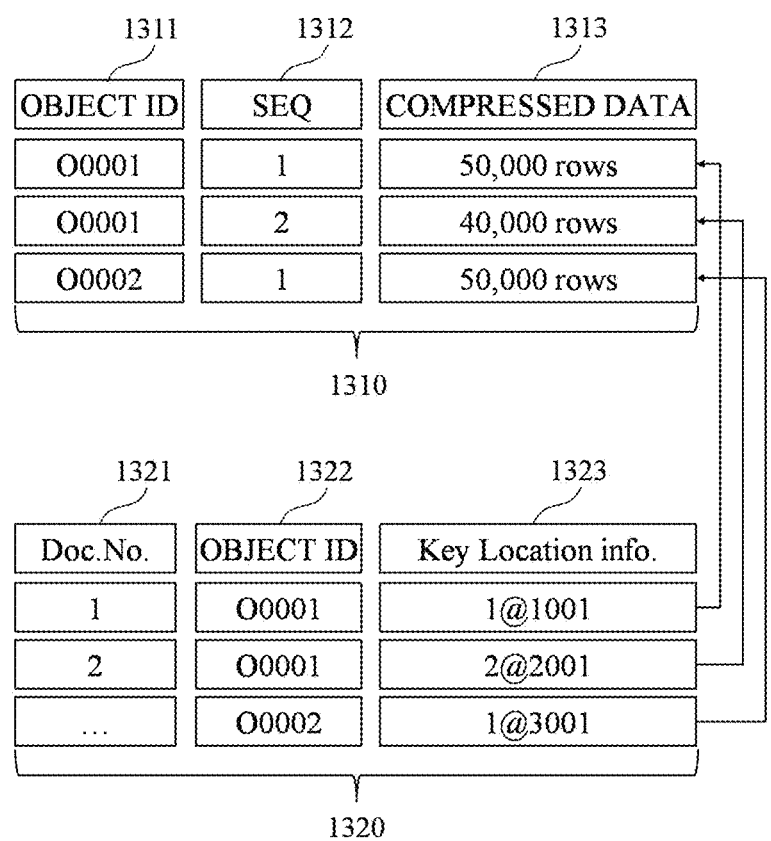
FIG. 13 is a diagram illustrating an example of the structure of a compression table and a key index table according to an embodiment of the present disclosure.

FIG. 13 is a diagram illustrating an example of the structure of a compression table 1310 and a key index table 1320 according to an embodiment of the present disclosure.

The compression table 1310 may include an OBJECT ID field 1311 having a storage key as a field value, an SEQ field 1312 having the sequence of a target table as a field value, and a COMPRESSED DATA field 1313 having a compression partition as a field value. The sequence may be defined as a sequence in which assuming that a parent table and a child table are present, the parent table is first extracted and the child table is extracted using extracted data of the parent table.

The key index table 1320, as already described, may include a Doc. No. field 1321 having a primary key as a field value, an OBJECT ID field 1322 having a storage key as a field value, and a Key Location info. field 1323 having key index information as a field value. For example, in key index information 1@1001, "1" ahead of "@" may indicate a sequence corresponding to a field value of the SEQ field 1312, and "1001" subsequent to "@" may indicate a (1,001)-th data record among data records included in a corresponding compression partition. As a more detailed example, the first record of the key index table 1320 may indicate that a data record having a primary key of "1" may be included as a 1,001-th data record among the data records of a compression partition having a storage key of "00001" and a sequence of "1." Likewise, the second record of the key index table 1320 may indicate that a data record having a primary key of "2" may be included as a (2,001)-th data record among the data records of a compression partition having a storage key of "00001" and a sequence of "2."

As described above, the key index information may include is information on the location of a specific data record within a compression partition. The number of data records to be inquired can be reduced depending on a search condition of a user using a key index table (e.g., the key index table 1320 of FIG. 13), including key index information, a primary key and a storage key.

In another embodiment, the computer device 200 may search a connection table, connected to a first table (e.g., the table described at step 410) through a primary key, for a data record that belongs to data records included in a second compression partition generated by compressing the data records and that has the same primary key as a data record included in the first table, and may further store subindex information, that is, a location of the retrieved data record within the second compression partition, with respect to a data record having the same primary key in a key index table. The connection table is a table connected to the first table through the primary key. That is, the primary key may be present in both the first table and the connection table. The second compression partition may be data generated by compressing data records in a connection table, when the corresponding connection table connected to a first table through a primary key is present. In this case, the second compression partition may be generated using the same method as the compression partition described with reference to FIG. 4, and may be stored in a compression table along with a unique storage key like a compression partition. The subindex information is information on where a data record having a specific primary key is stored within the second compression partition. For example, information on a storage sequence indicating that a data record stored at a (1000)-th position, among information on 100,000 data records included in the second compression partition, may be stored as the subindex information. For example, if a connection table connected to a first table through a primary key is present in the database, with respect to a field that is not present in the first table, but is present in the connection table, a user may require field value information of the field. In this case, the computer device 200 may further store subindex information for a data record having the same primary key in the key index table so that even up to the connection table can be searched for.

In still another embodiment, if multiple connection tables are present in a first table, the computer device 200 may collect and compress pieces of subindex information of the connection tables, and may store the compressed subindex information in the key index table as new subindex information. For example, the computer device 200 may collect all of pieces of subindex information on locations within two or more second compression partitions with respect to data records having the same primary key in a connection table, may compress the collected values, and may store, as new subindex information, in a data record having the same primary key value in the key index table.

Figure 14:
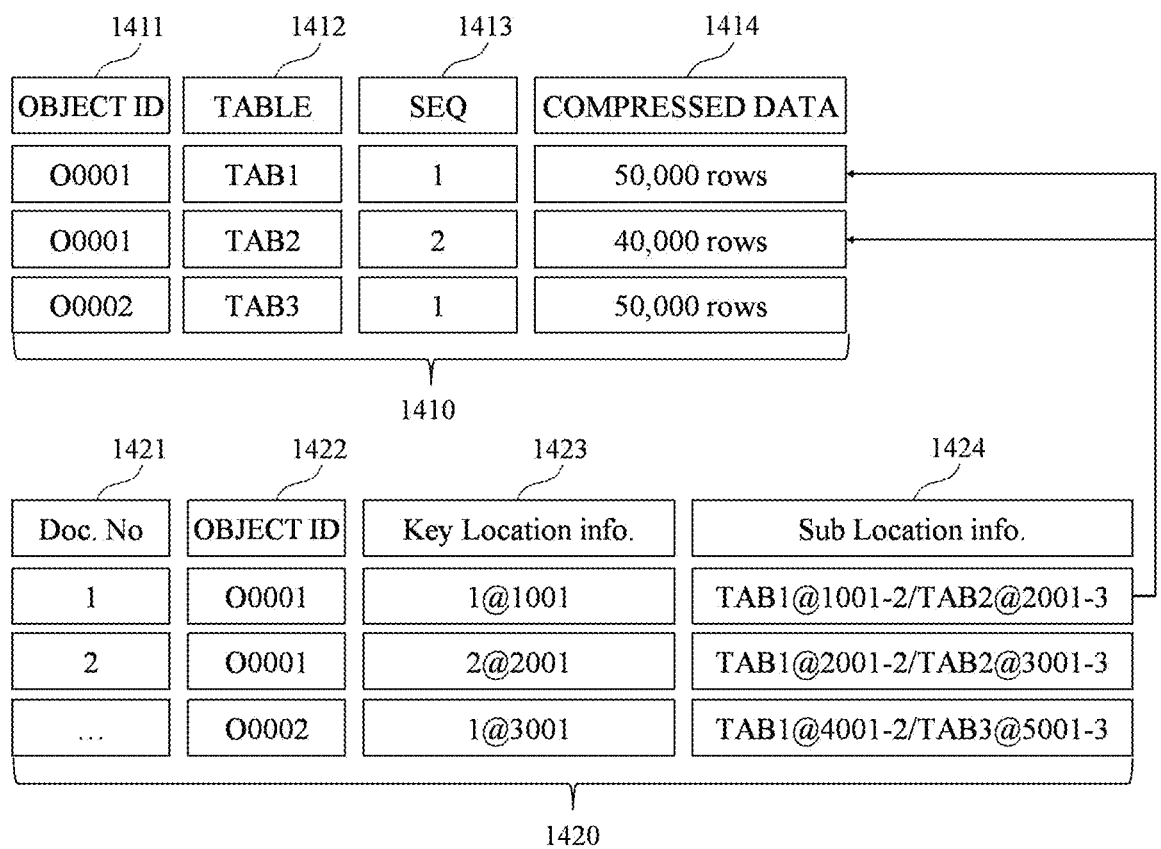
FIG. 14 is a diagram illustrating another example of the structure of a compression table and a key index table according to an embodiment of the present disclosure.

FIG. 14 is a diagram illustrating another example of the structure of a compression table 1410 and a key index table 1420 according to an embodiment of the present disclosure.

The compression table 1410 may include an OBJECT ID field 1411 having a storage key as a field value, a TABLE field 1412 having the identifier of a table as a field value, a SEQ field 1413 having a sequence as a field value, and a COMPRESSED DATA field 1414 having a compression partition as a field value. The TABLE field 1412 may include the identifier of a table as a field value. Accordingly, the TABLE field 1412 may identify that a corresponding compression partition includes data records extracted from which table.

The key index table 1420 according to the present embodiment may include a Doc. No. field 1421 having a primary key as a field value, an OBJECT ID field 1422 having a storage key as a field value, a Key Location info. field 1423 having key index information as a field value, and a Sub Location info. field 1424 having subindex information as a field value.

For example, the first record of the key index table 1420 may indicate that a data record having a primary key of "1" is included as a (10,001)-th data record, among data records of a compression partition having a storage key of "00001" and a sequence of "1." In this case, the field value "TAB1@1001-2/TAB2@2001-3" of the Sub Location info. field 1424 illustrates the location of a data record, having the primary key of "1", within a second compression partition generated with respect to a connection table. For example, in the field value "TAB1@1001-2/TAB2@2001-3", "TAB1" and "TAB2" ahead of "@" may mean connection tables connected through the same primary key. "1001-2" subsequent to "@" illustrates two data records (i.e., a (1,001)-th data record (first data record) and a (1,002)-th data record (second data record)) from the (1,001)-th data record, among data records included in the second compression partition for the connection table "TAB1." Furthermore, "2001-3" subsequent to "@" illustrates three data records (i.e., a (2,001)-th data record (third data record), a (2,002)-th data record (fourth data record) and a (2,003)-th data record (fifth data record)) from the (2,001)-th data record, among the data records included in the second compression partition for the connection table "TAB2." In this case, all the data records from the first data record to the fifth data record may be identified by the same primary key.

Figure 15:
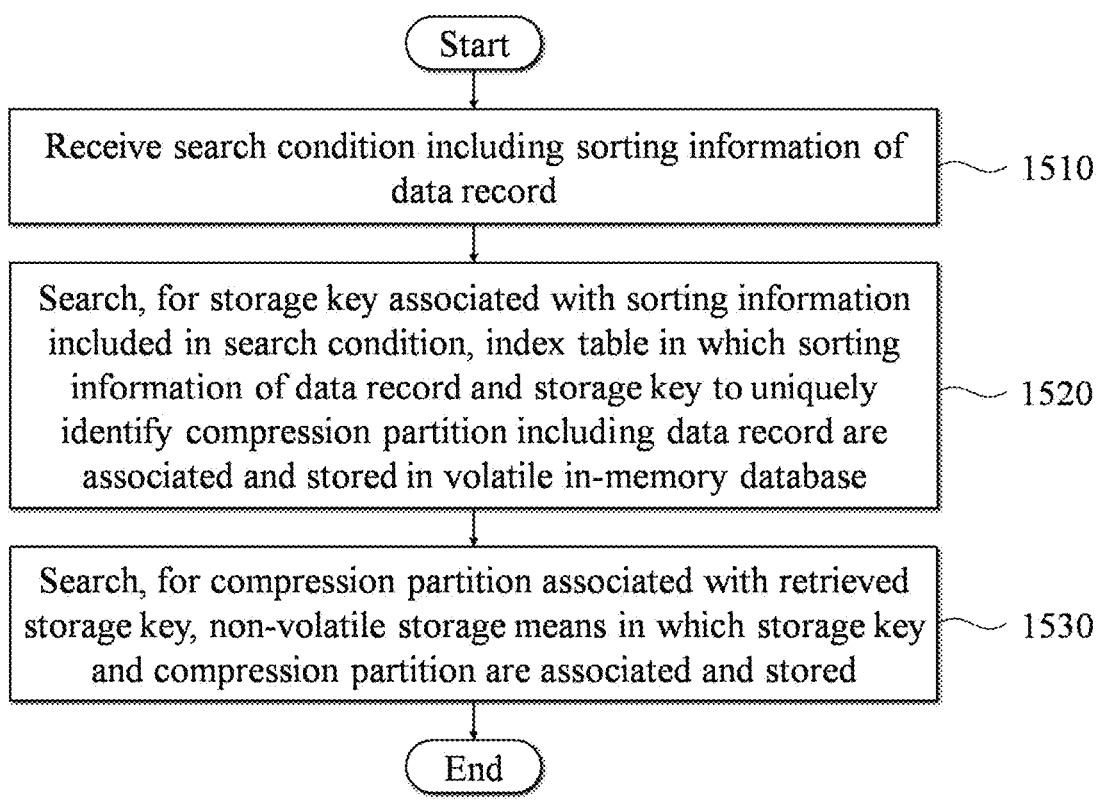
FIG. 15 is a diagram illustrating an example of a process of searching for archived data using a second function in an embodiment of the present disclosure.

FIG. 15 is a diagram illustrating an example of a process of searching for archived data using the second function in an embodiment of the present disclosure. The process according to the present embodiment may be performed by the computer device 200 that implements the target system 320 using the second function provided by the data archiving system 310.

At step 1510, the computer device 200 may receive a search condition including sorting information of a data record. The sorting information may include a given field value of a data record to be searched for and/or information on time of the corresponding data record. The field value and/or information on time included in the sorting information may be included in the form of a range.

At step 1520, the computer device 200 may search, for a storage key associated with the sorting information included in the search condition, an index table in which sorting information of a data record and a storage key to uniquely identify a compression partition including a data record are associated and stored in a database. As already described above, the index table may include a group index table and/or a period index table. The group index table may associate and store a specific field value and a storage key. The period index table may associate and store information on time and the storage key. Accordingly, the computer device 200 may search the group index table and/or the period index table for a storage key corresponding to a field value included in the sorting information and/or information on time. For example, when sorting information includes a given field value of a data record, the computer device 200 may search a group index table in which a storage key and the given field value are associated and stored, for the storage key associated with the given field value, which is included as the sorting information of a search condition. For another example, when sorting information includes information on time of a data record, the computer device 200 may search a period index table in which a storage key and the information on time are associated and stored, for the storage key associated with the information on time, which is included as sorting information of a search condition.

At step 1530, the computer device 200 may search a compression table in which a storage key and a compression partition are associated and stored, for a compression partition associated with the retrieved storage key. As already described above, the compression table may associate and store the compression partition and the storage key to uniquely identify the compression partition. Accordingly, the computer device 200 can search the compression table for the corresponding compression partition through the storage key.

As already described above, if a key index table is further used, a user may use a primary key for search. As described above, the key index table may associate and store a primary key, key index information that is a location of a corresponding data record within a compression partition compressed to include the corresponding data record, and a storage key corresponding to the compression partition compressed to include the corresponding data record, with respect to each of data records included in a given table in a database. In this case, if a search condition further includes the primary key of the data record, the computer device 200 may search the key index table for key index information and a storage key associated with the primary key further included in the search condition. Thereafter, the computer device 200 may search the compression partition, retrieved at step 1530, for a specific data record according to the search condition further based on the retrieved key index information and storage key.

Furthermore, when a connection table connected to a given table through a primary key is present, the key index table may further include subindex information, that is, a location of a data record in a second compression partition generated by compressing the data record in the connection table. Accordingly, if a search condition further includes a primary key, the computer device 200 may further search the key index table for subindex information associated with the primary key further included in the search condition, and may further search the second compression partition for a data record according to the search condition based on the second compression partition and the subindex information. Accordingly, the computer device 200 can also obtain a field value of the connection table connected to a first table through the primary key in addition to a field value of the first table, with respect to a specific data record.

As already described above, the compression table may include a compression table of the database of another computer device connected to the computer device 200 over the network. In this case, at step 1530, the computer device 200 may search the compression table of the database of the another computer device, connected thereto over the network, for a compression partition associated with the storage key retrieved at step 1520.

Steps 1510 to 1530 may be performed using the second function provided by the data archiving system 310. In other words, the data archiving system 310 may provide the second function including a function for controlling the target system 320 to perform steps 1510 to 1530.

Figure 16:
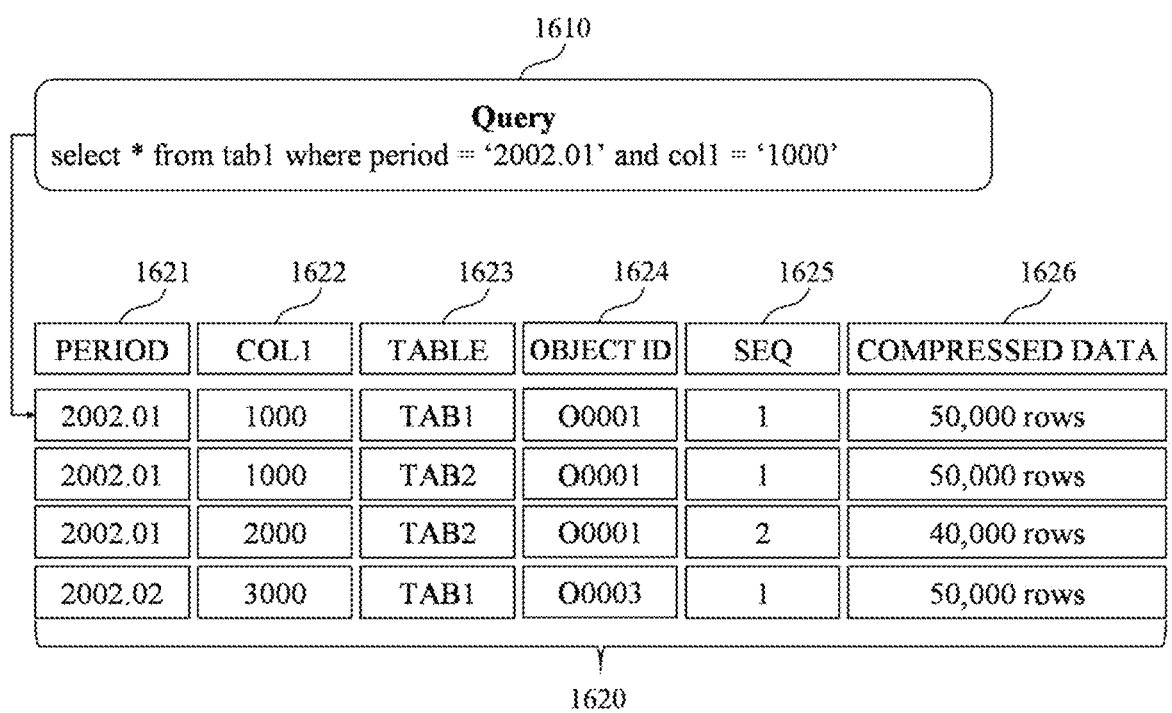
FIGS. 16 and 17 are diagrams illustrating examples in which archived data is searched for in an embodiment of the present disclosure.
Figure 17:
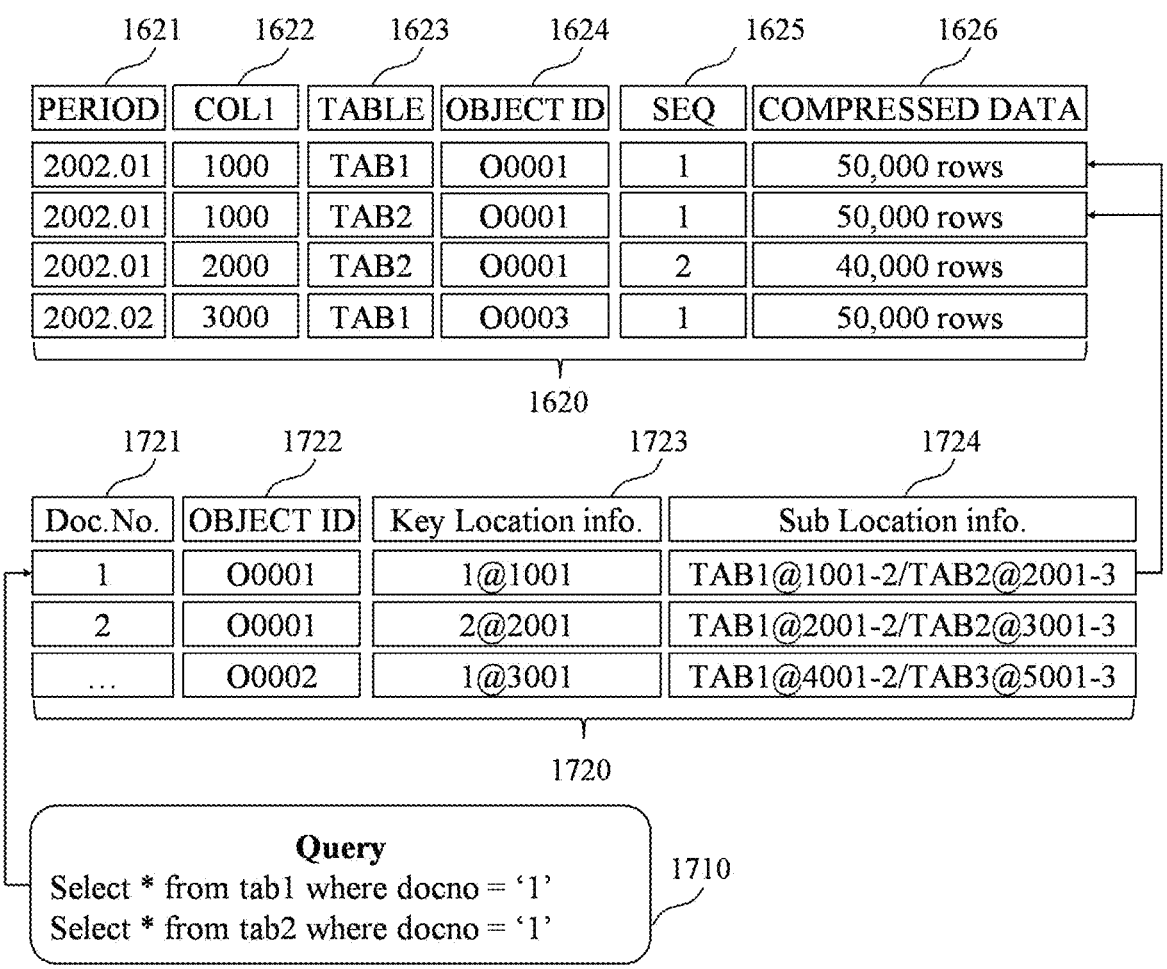

FIGS. 16 and 17 are diagrams illustrating examples in which archived data is searched for in an embodiment of the present disclosure.

FIG. 16 illustrates an example in which archived data is searched for in a compression table 1620 through a query 1610. In the embodiment of FIG. 16, the compression table 1620 has a form combined with an index table, and includes a PERIOD field 1621, a COL1 field 1622, a TABLE field 1623, an OBJECT ID field 1624, a SEQ field 1625, and a COMPRESSED DATA field 1626. In some embodiments, the PERIOD field 1621 and the COL1 field 1622 may be present in separate index tables. In this case, in order to connect the compression table 1620 and the index tables, the OBJECT ID field 1624 may be present in each of the two index tables. In some embodiments, the TABLE field 1623 and the SEQ field 1625 may also be present in the index table.

In this case, the query 1610 may mean an instruction that instructs to search a table "TAB1" for a data record in which a field value of the PERIOD field 1621 is "2002.01" and a field value of the COL1 field 1622 is "1000." In this case, the computer device 200 may check that a data record corresponding to the query 1610 is a compression partition stored in the COMPRESSED DATA field 1626 of the first record of the compression table 1620 in the compression table 1620. Accordingly, the computer device 200 may decompress the corresponding compression partition, and may provide, as the results of the search, data records (data records of "50,000 rows") included in the corresponding compression partition.

FIG. 17 illustrates an example in which archived data is searched for in the compression table 1620 based on a query 1710. In an embodiment of FIG. 17, a key index table 1720 may be used because the query 1710 uses a primary key as a search condition. The key index table 1720 includes a Doc. No. field 1721, an OBJECT ID field 1722, a Key Location Info. field 1723, and a Sub Location Info. field 1724.

The query 1710 may mean an instruction to instruct searching a table "TAB1" and a table "TAB2" for a data record in which a field value of the Doc. No. field 1721 as a primary key is "1." In this case, the computer device 200 may check the first record in which a field value of the Doc. No. field 1721 is "1" in the key index table 1720, and may search the compression table 1620 for data records, each one having a primary key of "1", based on a field value of the Sub Location Info. field 1724 of the first record. For example, the computer device 200 may extract data records, each one having a primary key of "1", from the compression table 1620 based on subindex information "TAB1@1001-2/TAB2@2001-3" of the first record of the key index table 1720 in which a field value of the Doc. No. field 1721 is "1." In this case, data records each having a value of a specific primary key can be searched for easily and rapidly although all data records included in compression partitions are not searched for based on a location included in subindex information.

Referring back to FIG. 3, the data archiving system 310 can optimize the data of the target system 320 and the storage system 330 using a data query log, in an embodiment in which another external system (e.g., cloud storage system) of the target system 320 includes the storage system 330. For example, the data archiving system 310 can continuously optimize a data capacity and user access speed between the target system 320 and the storage system 330 by analyzing at least one of (1) the past table access log of an on-premise database (i.e., database retained and operated by a company using own equipment not a cloud environment), (2) the amount of access predicted using machine learning based on the past table access log, and (3) an access log after a change of data into the storage system 330.

Figure 18:
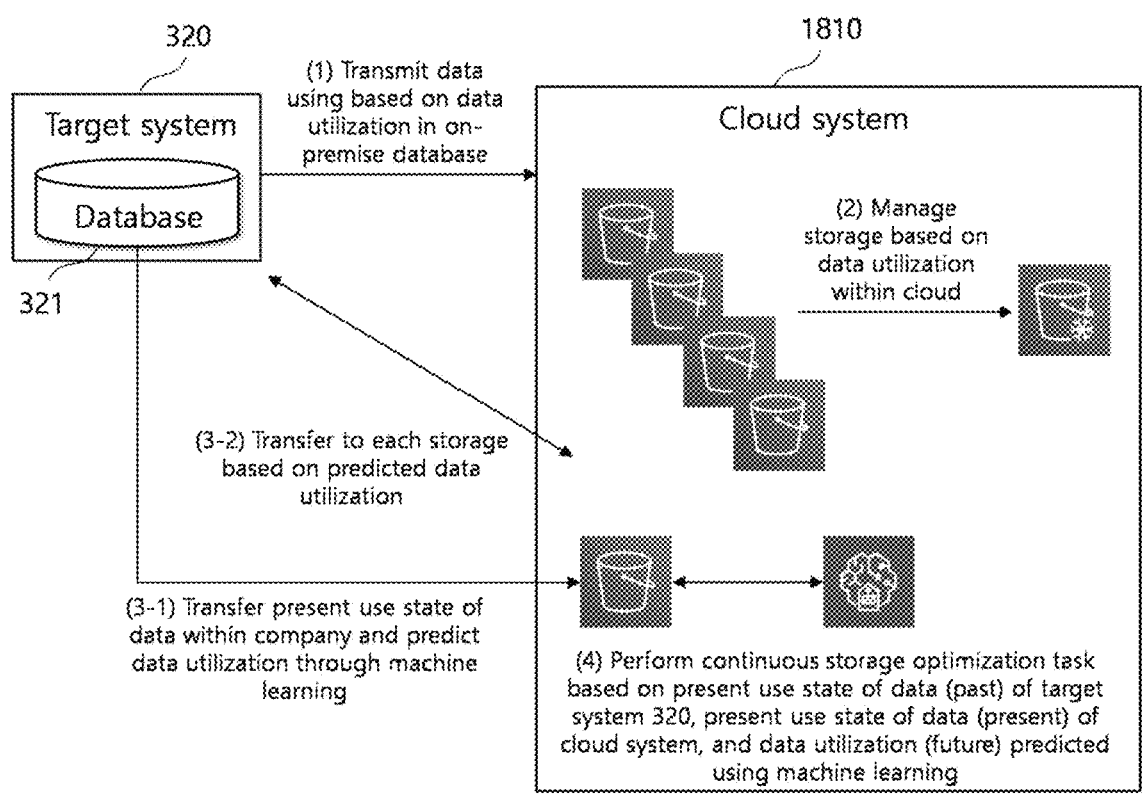
FIG. 18 is a diagram illustrating an example of a process for effectively storing data in an embodiment of the present disclosure.

FIG. 18 is a diagram illustrating an example of a process for effectively storing data in an embodiment of the present disclosure. FIG. 18 illustrates the target system 320 and a cloud system 1810. In an embodiment of FIG. 18, both the storage system 330 and the data archiving system 310 may be implemented on the cloud system 1810. In order to effectively store data in a remote repository (i.e., the storage system 330 implemented in the cloud system 1810), the data archiving system 310 may differently manage a storage class depending on data utilization. For example, the data archiving system 310 may provide the target system 320 with a function for controlling the target system 320 to transmit data based on data utilization in an on-premise database. In this case, the data archiving system 310 may classify data into classes by analyzing the present use state of data of the target system 310 using such a function, and may separate the data into the classes before transmitting the data to the cloud system 1810. In this case, the cloud system 1810 may also include a class storage for each class. The data of a class corresponding to a specific class storage may be stored in the corresponding class storage.

Furthermore, the data archiving system 310 may separate and store the present use state of data transmitted to the cloud system 1810 for each business object and/or each period by monitoring the present use state. For example, the data archiving system 310 may manage the storage based on data utilization within the repository of the cloud system 1810.

The data archiving system 310 may control the target system 320 to transmit the present use state of data to the cloud system 1810, may analyze the utilization of the data using machine learning, and may store the data in each class storage. For example, the data archiving system 310 may control the target system 310 to transfer the present use state of data within a company to the cloud system 1810 for a given period, and may predict data utilization based on machine learning applied to the present use state of the data. Furthermore, the data archiving system 310 may process the transfer of the data between the target system 320 and the cloud system 1810 so that the data is optimized based on the predicted data utilization. For example, data that is stored in the repository (i.e., the storage system 320) of the cloud system 1810 and that has data utilization of a first threshold or more may be transferred to the repository (i.e., the database 321) of the target system 320. Data that belongs to the data stored in the repository of the target system 320 and that has data utilization of a second threshold or less may be transferred to the repository of the cloud system 1810. The transfer of data may require the compression or decompression of the data described with reference to the embodiments of FIGS. 3 to 17.

As described above, the data archiving system 310 may perform a continuous storage optimization task based on the present use state of data (past) of the target system 320, the present use state of data (present) of the cloud system, and data utilization (future) predicted using machine learning.

In another embodiment, the data archiving system 310 may provide a function for performance optimization of the target system 320. For example, a case where the target system 320 is positioned in the form of an instance in a cloud environment may be taken into consideration. In this case, for example, after data of the target system 320 is deleted (or after the amount of a storage space used is reduced according to the aforementioned continuous storage optimization task), the data archiving system 310 may monitor overall performance (e.g., a CPU, the amount of a memory used, and a system response speed) of the target system 320, positioned in the form of an instance in the cloud environment, based on the database capacity of the target system 320, and may reduce the expenses of the target system 320 by changing the specifications of the target system 320 into a server type capable of a cost reduction based on the monitored performance. For example, the data archiving system 310 may provide an instance optimization function considered along with CPU and memory efficiency not a data volume optimization viewpoint. To this end, the data archiving system 310 may review the possibility that an additional resource may be optimized based on a data volume reduction. As a more detailed example, the data archiving system 310 may measure time for each flow by analyzing the technical bill of material (BOM) of a program having high use frequency during a recent given period (e.g., 1 year) and an internal structure of the program, and may reduce the processing time of database-related logic, thereby enabling a reduction of specifications, such as a CPU and a memory. Furthermore, the data archiving system 310 may change an instance for an implementation of the target system 320 into an instance having an economically one-step lower level, compared to the class of an initial setting instance. A system response rate, CPU utilization, a processing time, a database response time, etc. in addition to the technical BOM and the internal structure of the program, may be used for the measurement of time for each flow.

In another embodiment, the data archiving system 310 may provide a data non-identification function. Upon collection of data archiving, non-identification may be required for business requirements and/or legal requirements. Alternatively, non-identification may be necessary to use data, archived in the storage system 330, in another system not the target system 320. FIG. 19 is a diagram illustrating an example of a method of non-identifying data in an embodiment of the present disclosure.

The aforementioned system or apparatus (or device) may be implemented by a hardware component or a combination of a hardware component and a software component. For example, the device and components described in the embodiments may be implemented using one or more general-purpose computers or special-purpose computers, like a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processor may perform an operating system (OS) and one or more software applications executed on the OS. Furthermore, the processor may access, store, manipulate, process and generate data in response to the execution of software. For convenience of understanding, one processing device has been illustrated as being used, but a person having ordinary skill in the art may understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, code, an instruction or a combination of one or more of them and may configure a processor so that it operates as desired or may instruct the processor independently or collectively. The software and/or data may be embodied in a machine, component, physical device, virtual equipment or computer storage medium or device of any type in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as CD-ROM and a DVD, magneto-optical media such as a floptical disk, ROM, RAM, and flash memory. Furthermore, other examples of the medium may include an app store in which apps are distributed, a site in which other various pieces of software are supplied or distributed, and recording media and/or store media managed in a server. Examples of the program instruction may include machine-language code, such as a code written by a compiler, and a high-level language code executable by a computer using an interpreter.

As described above, according to embodiments of the present disclosure, a remote near-line data archiving function can be provided by receiving remote function invoking from a target system in which data is stored, providing the target system with the first function for archiving, in the storage system, at least some of the data stored in the target system over a network in response to such remote function invoking, and providing, to the target system, the second function for the query of the data archived in the storage system over the network.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims belong to the scope of the claims.

What is claimed is:
1. A data archiving method performed by a computer device,
included in a cloud system, comprising at least one processor, the data archiving method comprising:
receiving, by the at least one processor, remote function invoking from a target system in which data is stored;
providing, by the at least one processor, the target system with a first function for archiving, in a storage system, at least some of the data stored in the target system over a network in response to the remote function invoking; and providing, by the at least one processor, the target system with a second function for a query of the data archived in the storage system over the network,
wherein the target system directly handles archiving and querying of the data archived in the storage system based on the first function and the second function over the network,
wherein the first function and the second function are provided to the target system over the network, under the control of the computer device, using Software as a Service (SaaS) registered in the cloud system,
wherein providing the first function comprises providing a third function for compressing at least some of the data stored in a local database of the target system and archiving the compressed data in a first table of the local database of the target system,
the data archiving method further comprising:
providing, by the at least one processor, the target system with a fourth function for instructing the target system to archive and retain, in a file form, the data archived in the first table, when a retention period of the data archived in the first table elapses; and
providing, by the at least one processor, the target system with a fifth function for instructing the target system to delete data corresponding to the data archived in the file form from the first table,
wherein providing the first function further comprises:
providing a (1-1)-th function for controlling the target system to determine a partition for a data record included in the first table based on sorting information of the data record;
providing a (1-2)-th function for controlling the target system to generate a compression partition by compressing a data record for each partition;
providing a (1-3)-th function for controlling the target system to associate and store, in a compression table, the compression partition and a storage key to uniquely identify the compression partition;
providing a (1-4)-th function for controlling the target system to associate and store the storage key and the sorting information in an index table of the local database; and
providing a (1-5)-th function for controlling the target system to associate and store, in a key index table, a primary key, key index information which is a location of a corresponding data record within a compression partition compressed to comprise the corresponding data record, and a storage key corresponding to the compression partition compressed to comprise the corresponding data record, with respect to each of data records included in the first table,
wherein with respect to a second compression partition generated by compressing a data record in a connection table connected to the index table through the primary key,
the (1-6)-th function controls the target system to:
search for a data record having a primary key identical to the primary key of the data record included in the index table, among data records included in the second compression partition, and
store subindex information, which is a location of the retrieved data record within the second compression partition, with respect to the data record having the same primary key in the key index table,
wherein the key index information includes:

a sequence as a serial number of the compression partition containing a first data record corresponding to a first primary key; and
an order of the first data record in the compressed partition corresponding to the sequence, and
wherein the subindex information includes:
identifiers of connection tables connected through a second primary key;
a first delimiter that separate the identifiers of the connection tables connected through the second primary key;
ranges of data records identified through second primary key for each of the identifiers; and
a second delimiter that separate a identifier and a range for same connection table among the connection tables connected through the second primary key.

2. The method of claim 1, wherein:
the sorting information comprises a given field value of a corresponding data record, and
the (1-4)-th function controls the target system to associate and store the storage key and the given field value in a group index table of the local database.

3. The method of claim 1, wherein:
the sorting information comprises information on time of a corresponding data record, and
the (1-4)-th function controls the target system to associate and store the storage key and the information on time in a period index table.

4. The method of claim 1, wherein the (1-2)-th function controls the target system to generate the compression partition by compressing a data record included in the determined partition into a binary object.

5. The method of claim 1, wherein providing the second function comprises providing:
a (2-1)-th function for controlling the target system to receive a search condition comprising sorting information of a data record;
a (2-2)-th function for controlling the target system to search, for a storage key associated with the sorting information included in the search condition, the index table in which sorting information of a data record and a storage key to uniquely identify a compression partition comprising a corresponding data record are associated and stored in a local database of the target system; and
a (2-3)-th function for controlling the target system to search, for a compression partition associated with the retrieved storage key, the compression table in which a storage key and a compression partition are associated and stored.

6. A non-transitory computer-readable recording medium in which a computer program for executing the method of claim 1 in a computer device is stored.

7. A computer device included in a cloud system comprising:
at least one processor implemented to execute a computer-readable instruction stored on a non-transitory computer-readable recording medium to perform the data archiving method of claim 1.

8. The method of claim 1, wherein providing the first function comprises further providing a (1-7)-th function for controlling the target system to:
search the index table for a storage key associated with identification information included in a restoration request in response to the restoration request for the deleted data record, search the compression table for a compression partition associated with the retrieved storage key,
restore the deleted data record by decompressing the retrieved compression partition, and
record the restored data record on the first table based on the identification information.

* * * * *